United States Patent [19]

Hamisch, Jr.

[11] Patent Number: 4,498,389
[45] Date of Patent: Feb. 12, 1985

[54] LABELER WITH INKING MECHANISM

[75] Inventor: Paul H. Hamisch, Jr., Franklin, Ohio

[73] Assignee: Monarch Marking Systems, Inc., Dayton, Ohio

[21] Appl. No.: 467,579

[22] Filed: Feb. 17, 1983

Related U.S. Application Data

[60] Continuation of Ser. No. 193,553, Oct. 3, 1980, abandoned, which is a division of Ser. No. 653,403, Jan. 29, 1976, Pat. No. 4,249,973, Division of Ser. No. 540,051, Jan. 10, 1975, Pat. No. 3,952,652, which is a division of Ser. No. 312,454, Dec. 6, 1972, Pat. No. 3,968,745, which is a continuation-in-part of Ser. No. 208,035, Dec. 8, 1971, abandoned.

[51] Int. Cl.³ .......................... B41K 1/42; B41K 1/46
[52] U.S. Cl. .................................. 101/288; 101/359; 101/305
[58] Field of Search .................. 101/288, 295, 359

[56] References Cited

U.S. PATENT DOCUMENTS

| 741,520 | 10/1903 | Mankiwitz | 101/103 |
|---|---|---|---|
| 1,244,524 | 10/1917 | Marshall | 101/352 |
| 2,263,967 | 11/1941 | Greenleaf | 101/305 |
| 2,502,257 | 3/1950 | Hawkins et al. | 216/2 |
| 3,265,553 | 8/1966 | Kind et al. | 156/384 |
| 3,296,962 | 1/1967 | Gopperton | 101/305 |
| 3,343,485 | 9/1967 | Loeffler | 101/280 |
| 3,364,855 | 1/1968 | Boekeloo et al. | 101/327 |
| 3,440,123 | 4/1969 | Hamisch | 156/384 |
| 3,522,131 | 7/1970 | Sato et al. | 101/292 |
| 3,551,251 | 12/1970 | Sato et al. | 156/384 |
| 3,611,929 | 10/1971 | Schrotz | 101/292 |
| 3,705,833 | 12/1972 | Wada | 101/292 |
| 3,800,701 | 4/1974 | Martin | 101/288 |
| 3,832,943 | 9/1974 | Kirby | 101/103 |
| 4,359,940 | 11/1982 | Sato | 101/359 |

Primary Examiner—William Pieprz
Attorney, Agent, or Firm—Joseph J. Grass

[57] ABSTRACT

There is disclosed label printing and applying apparatus by which labels are successively printed and applied to merchandise. The apparatus feeds pressure sensitive labels mounted on a web of supporting material to a printing zone and to a delaminating zone. An applicator disposed downstream of the delaminating zone is used to apply the labels to merchandise.

14 Claims, 70 Drawing Figures

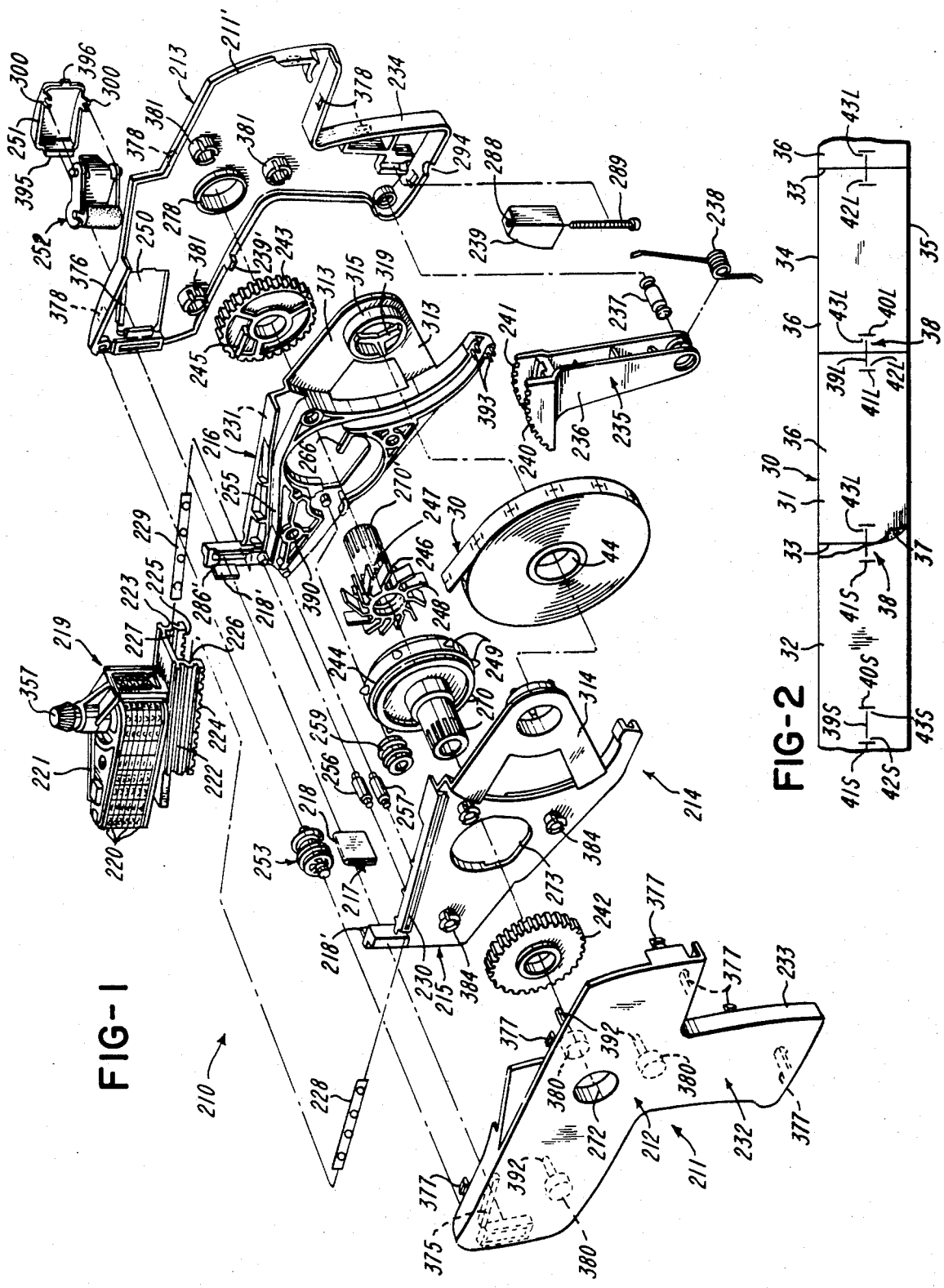

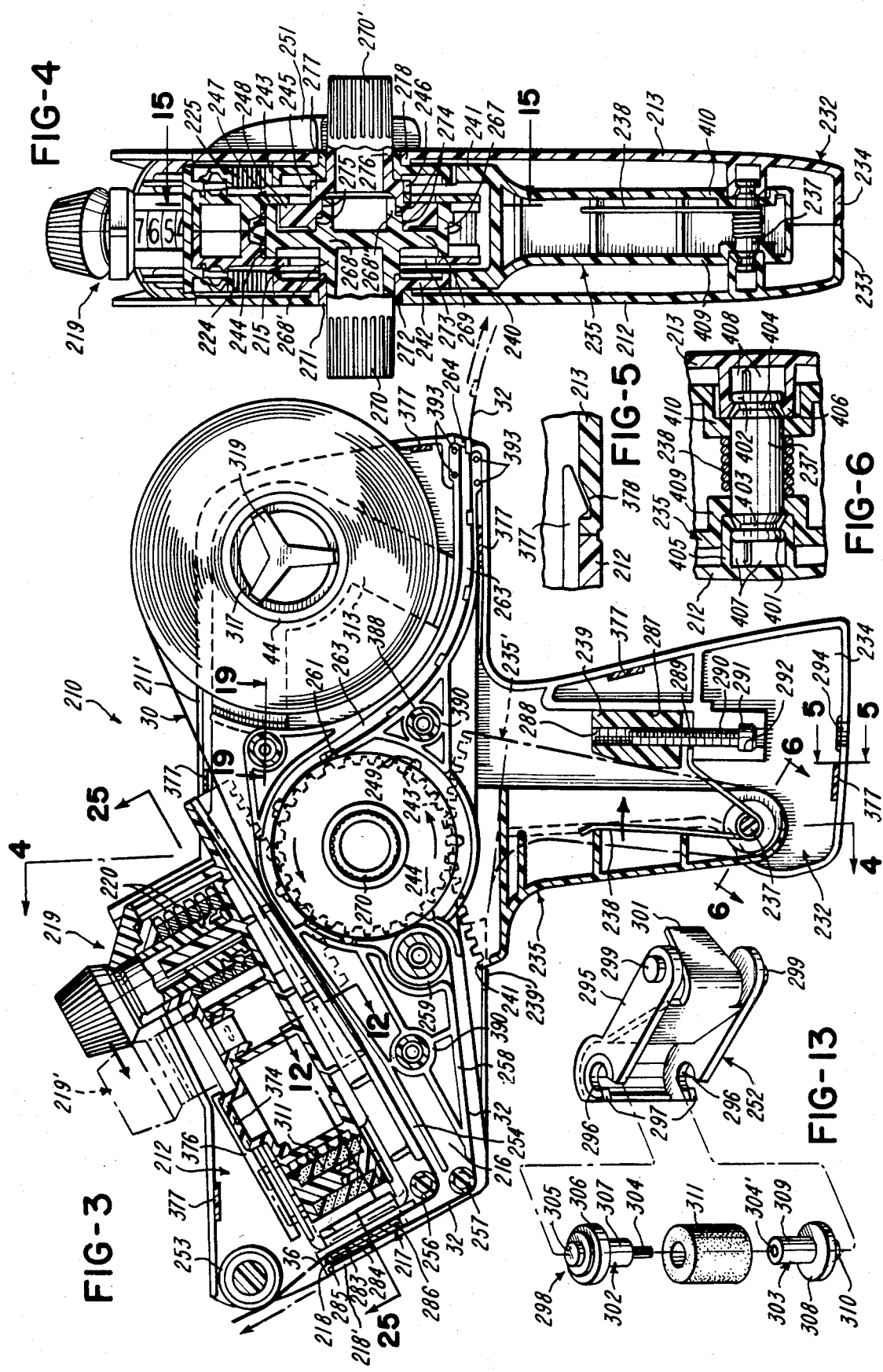

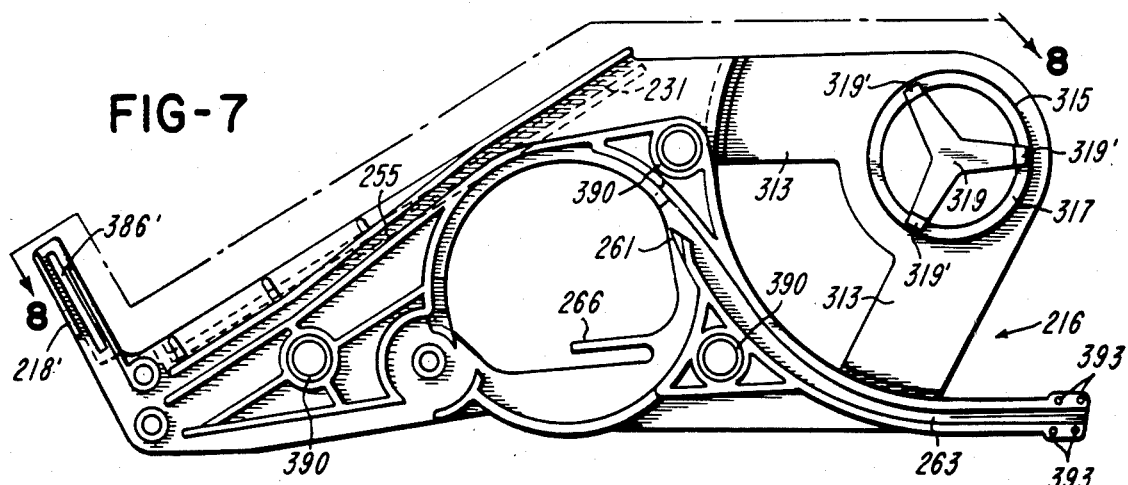
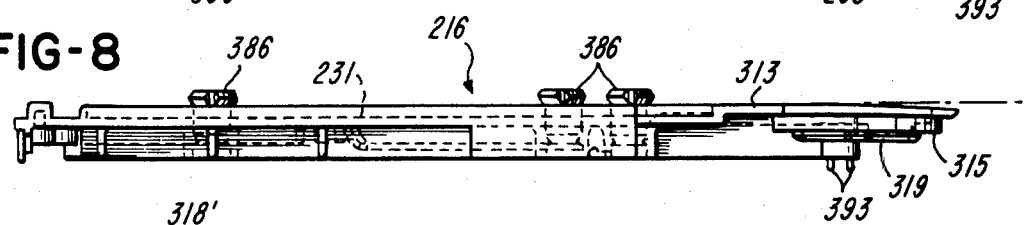
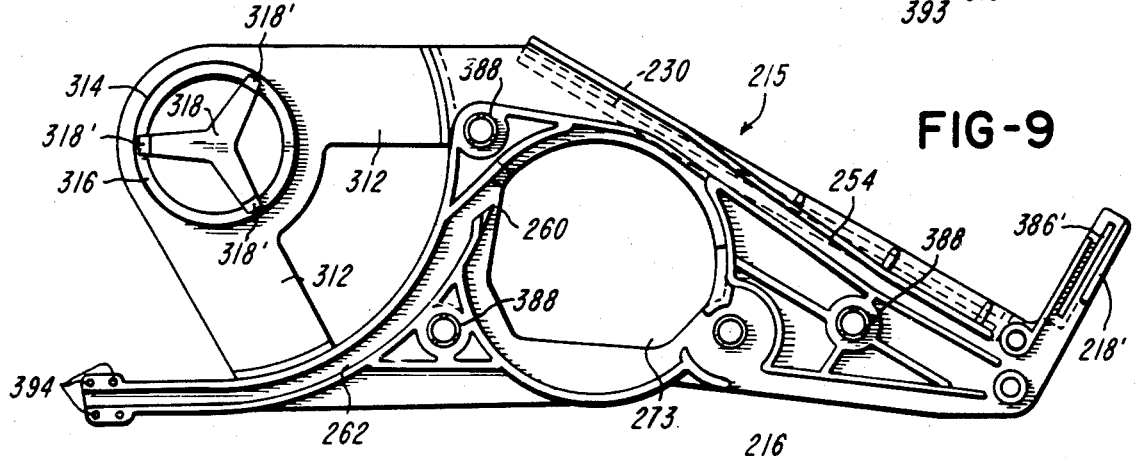
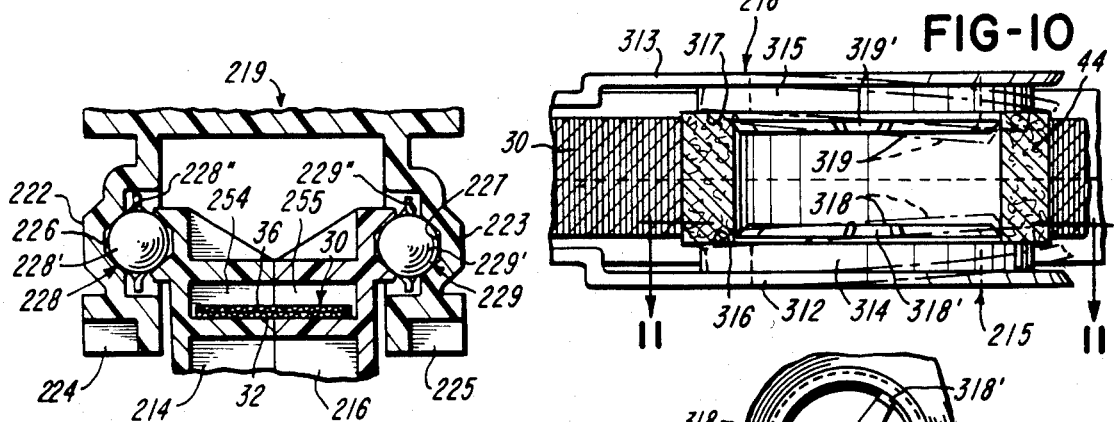
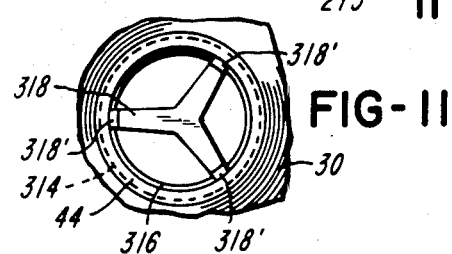

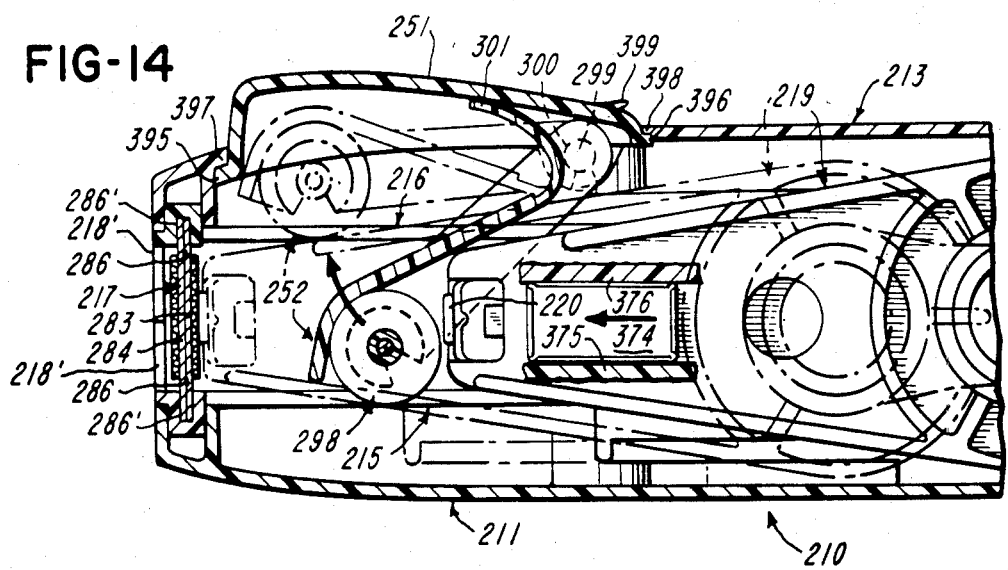
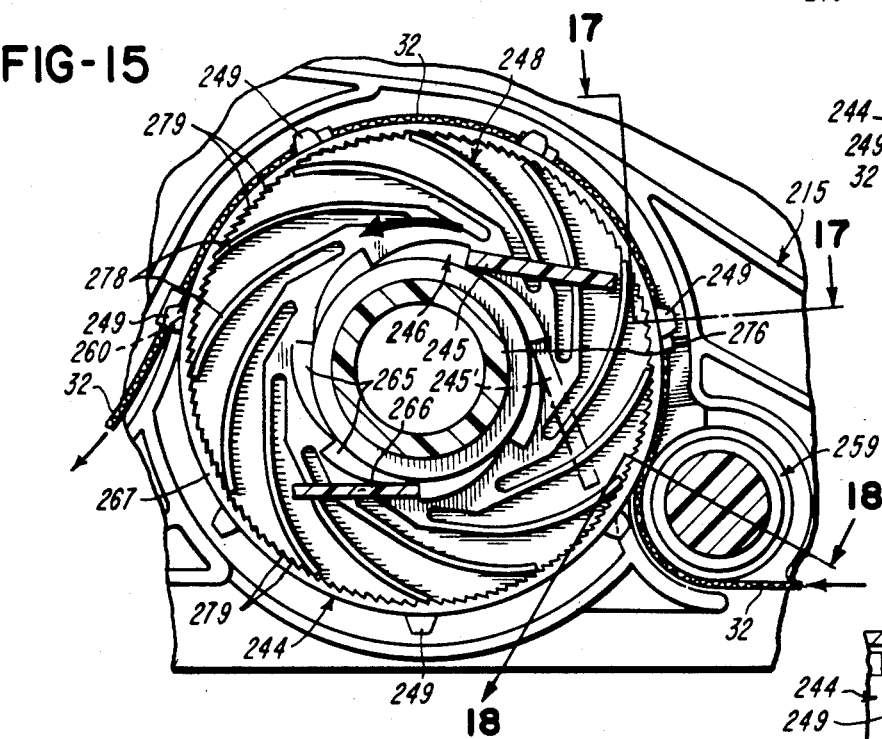
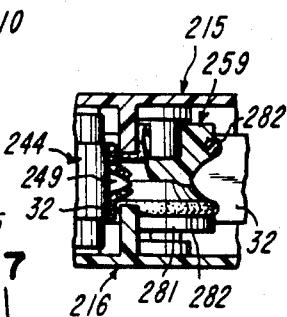
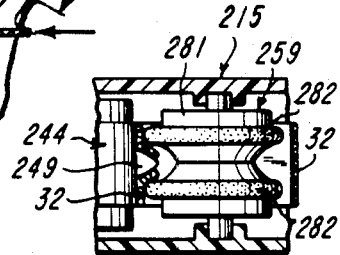
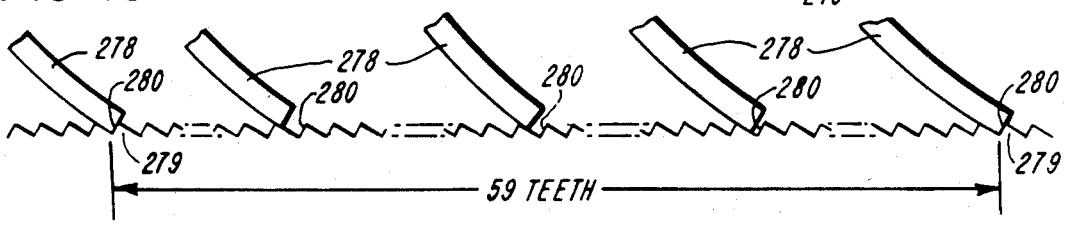

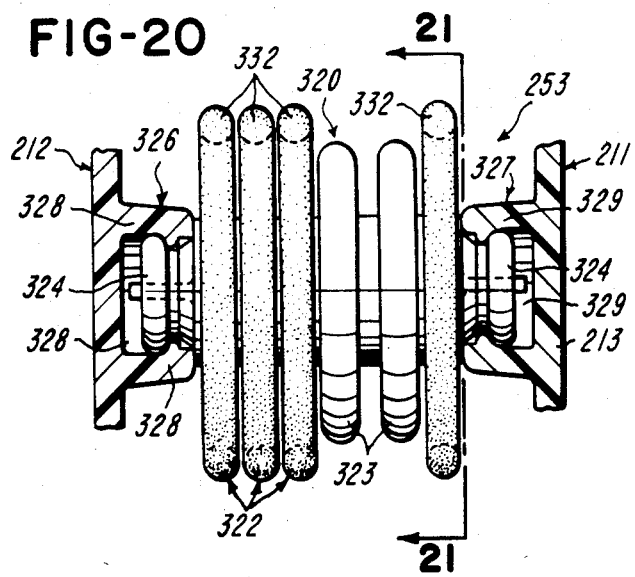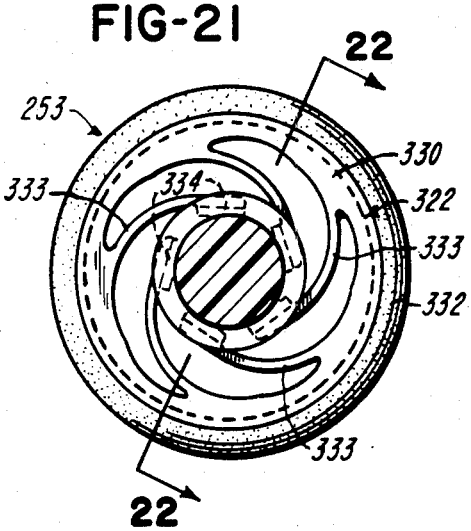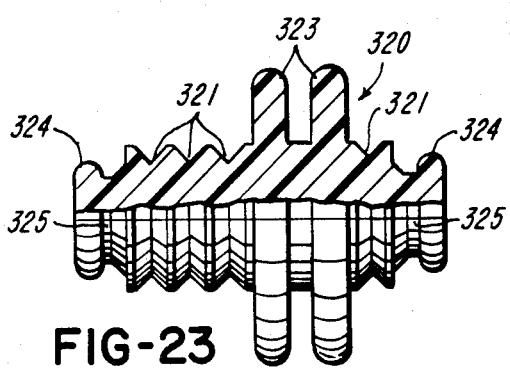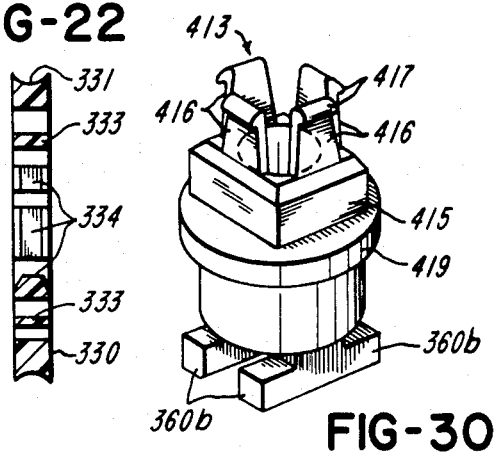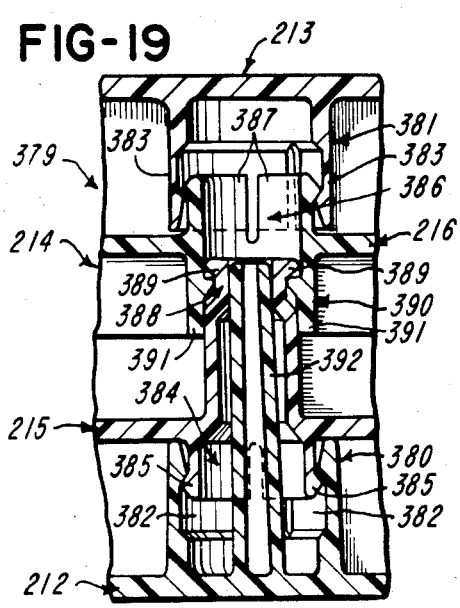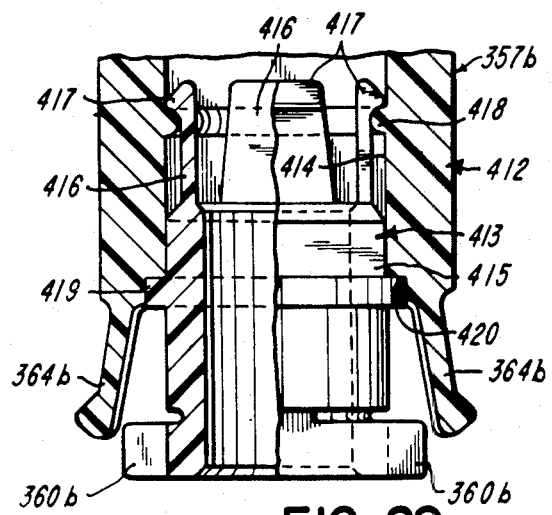

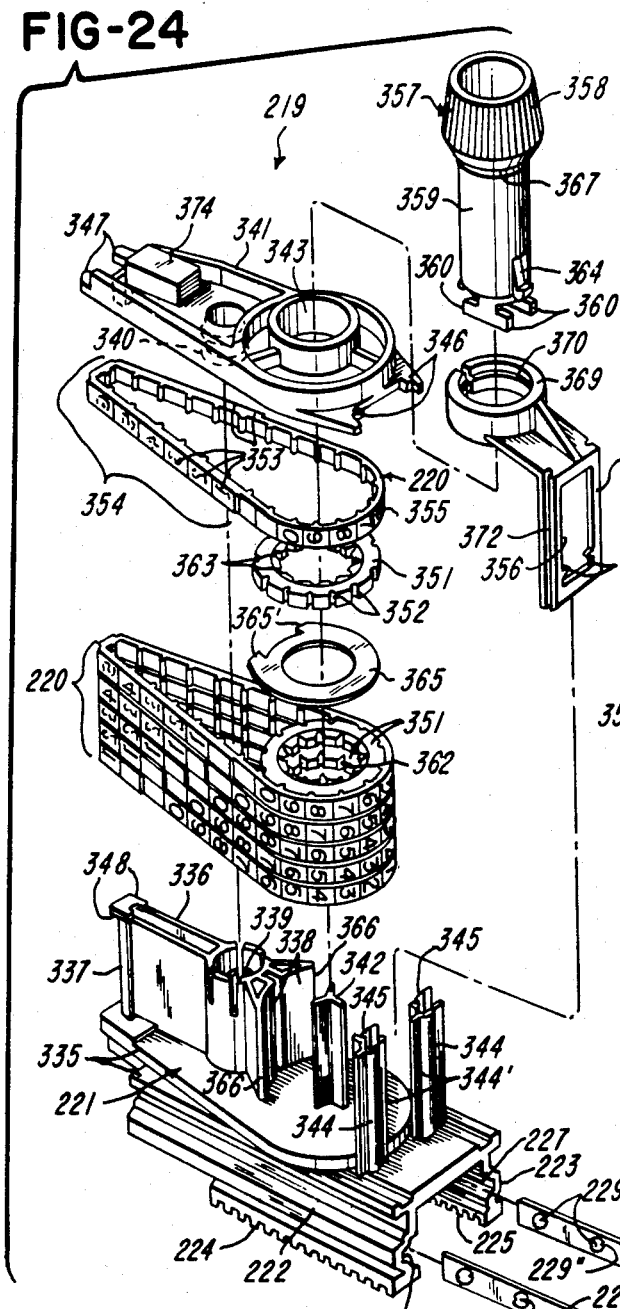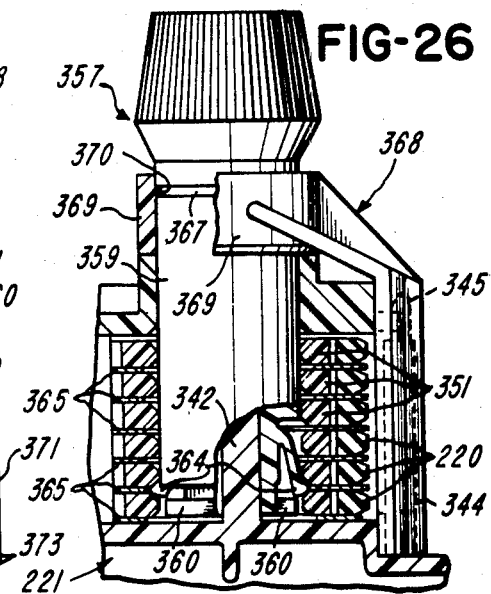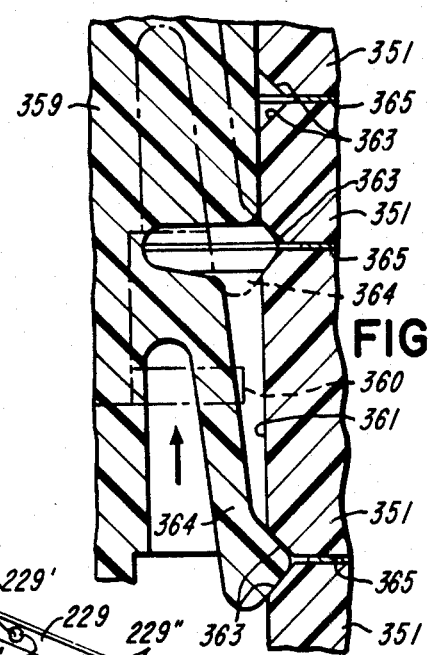

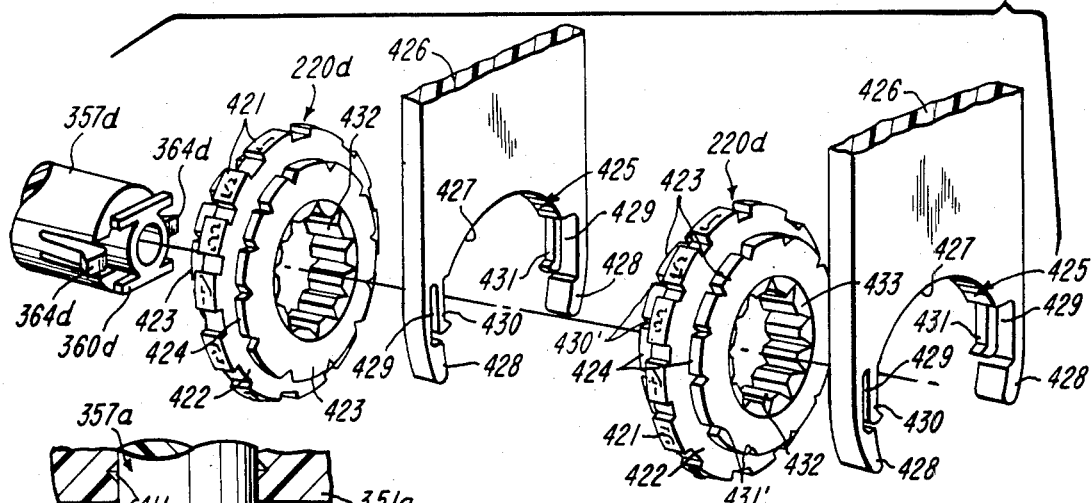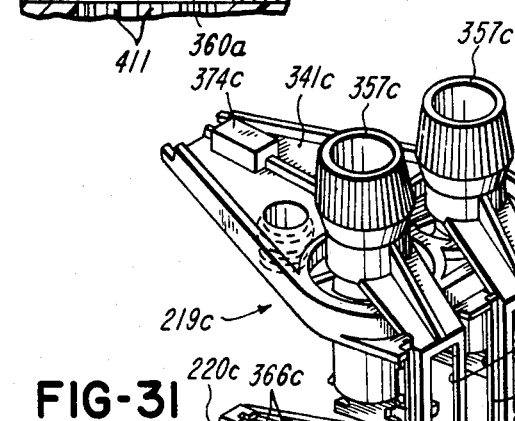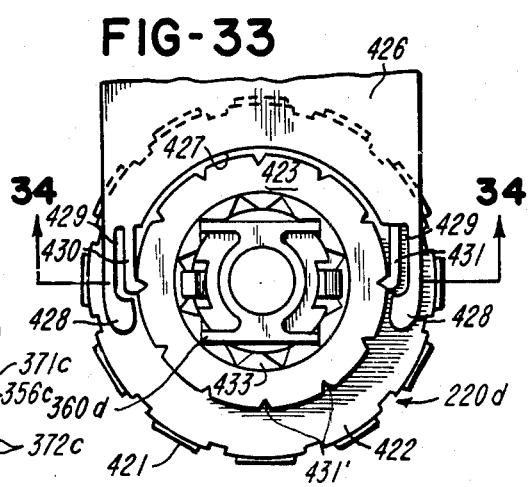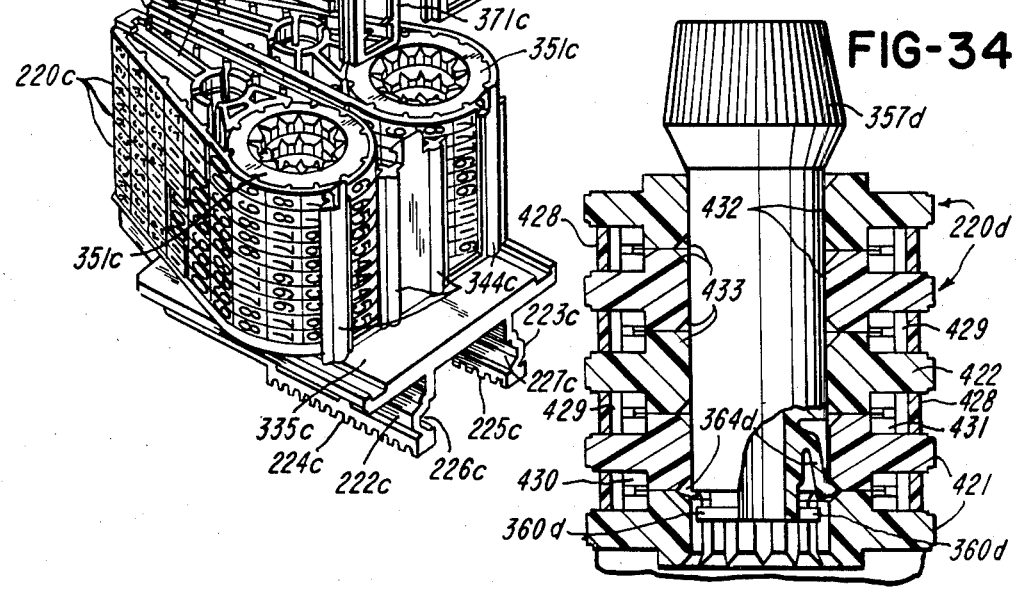

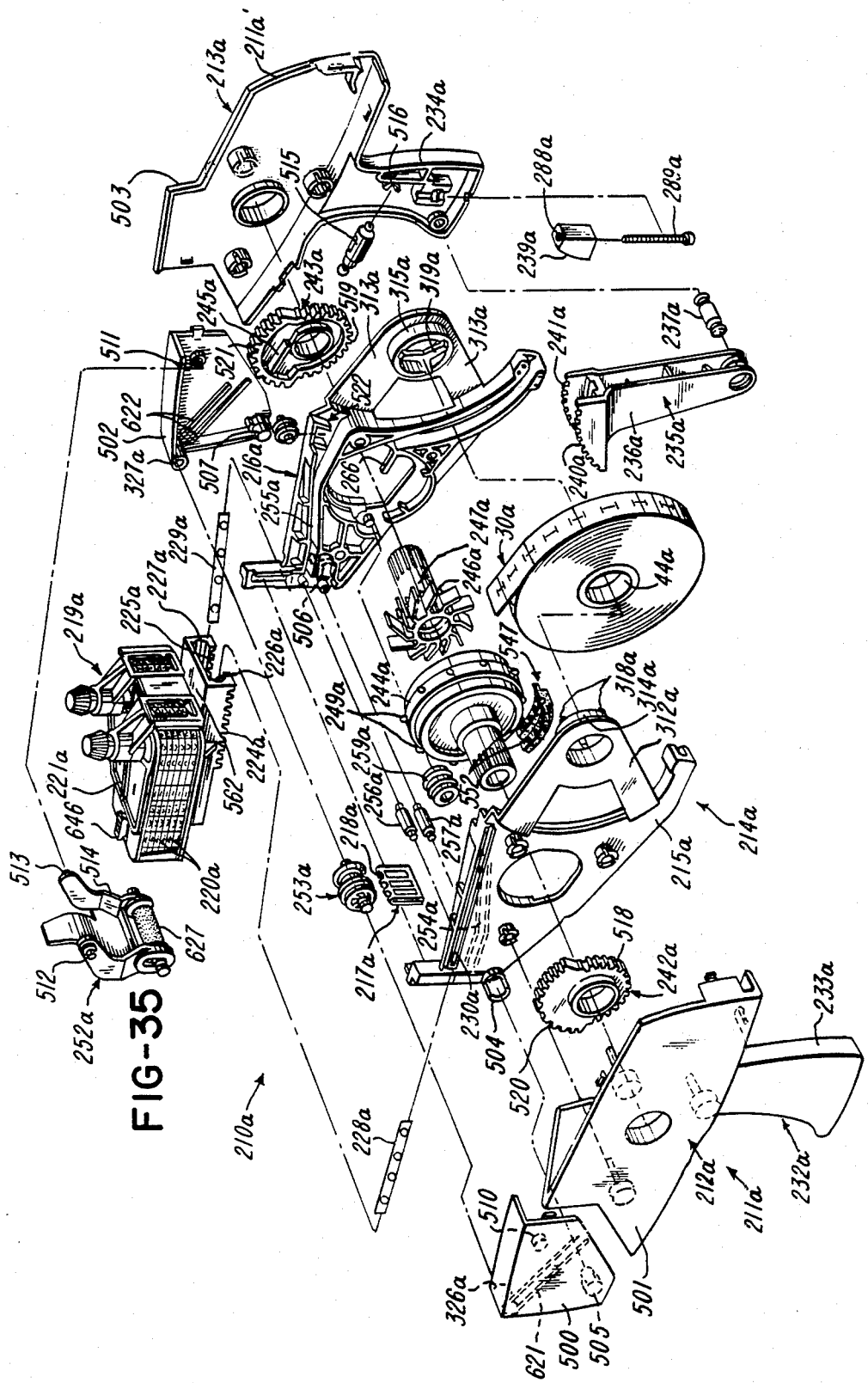

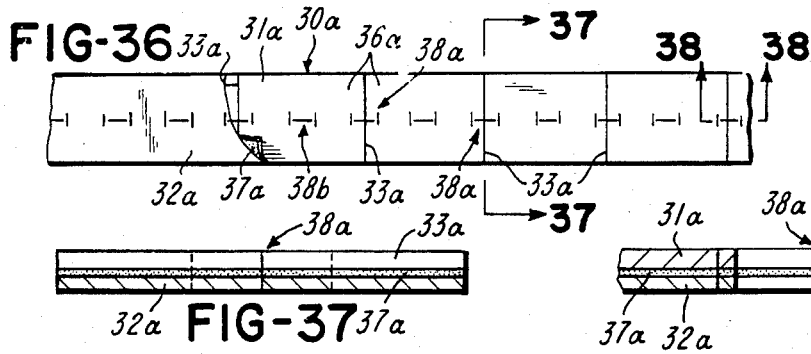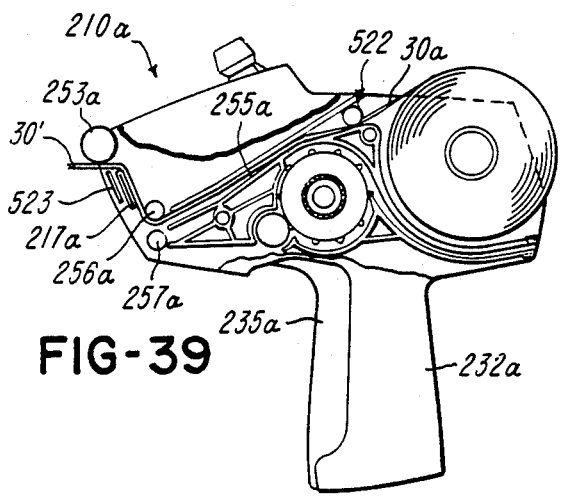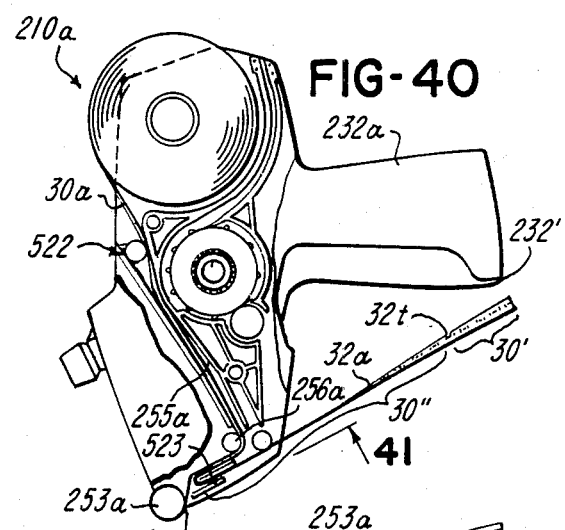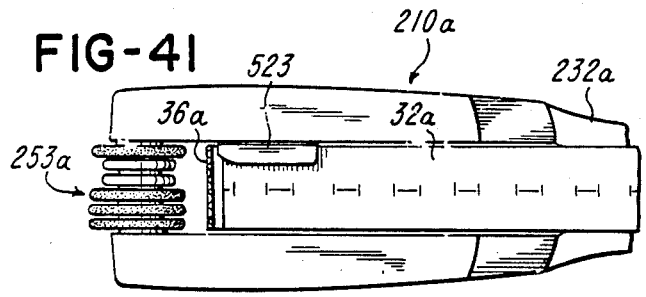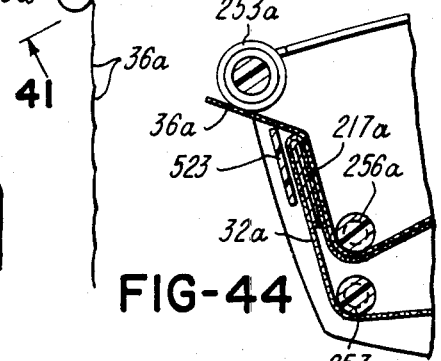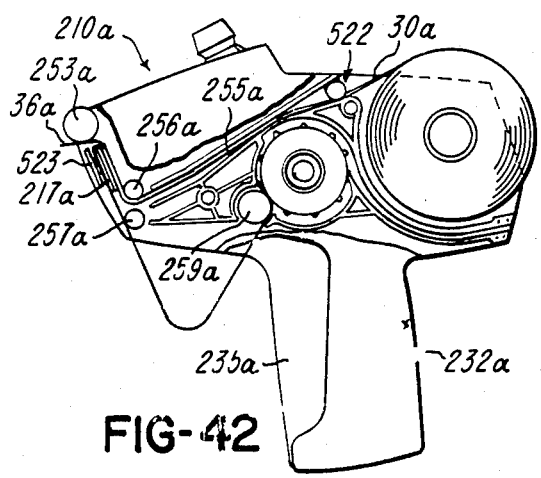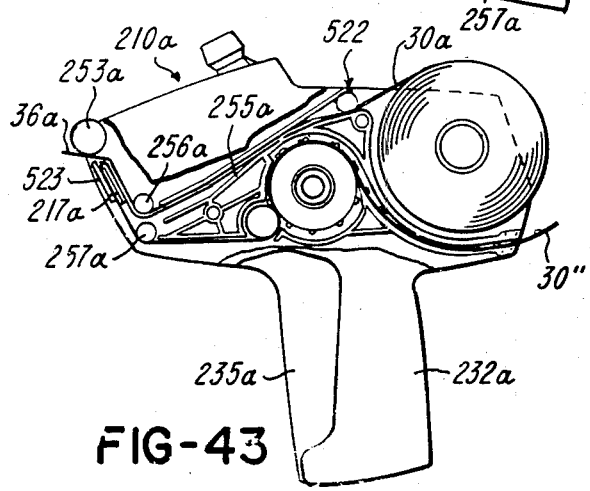

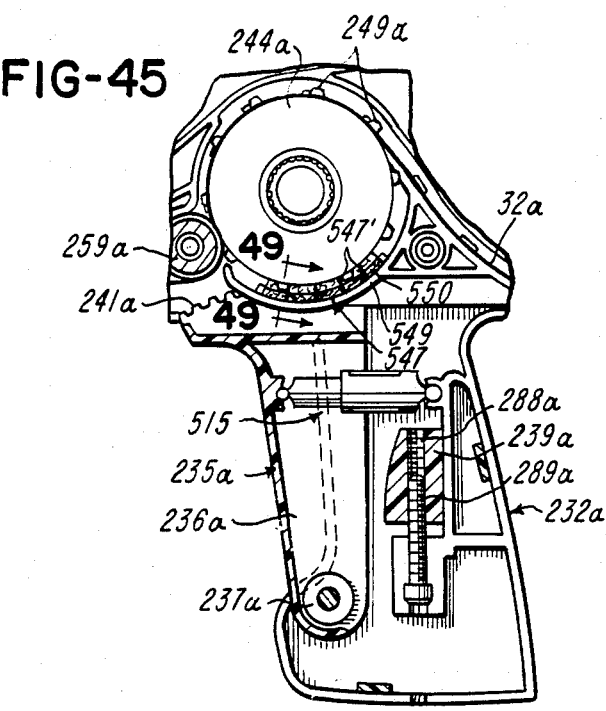
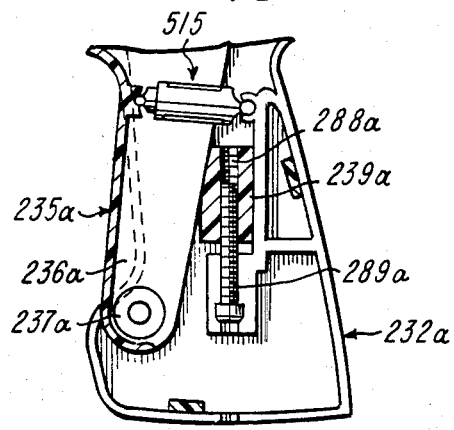
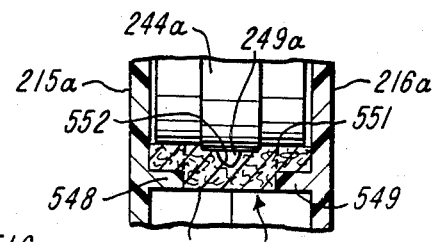
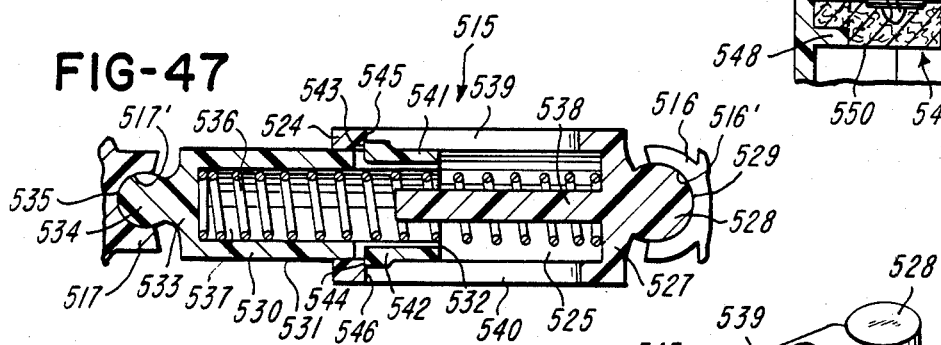
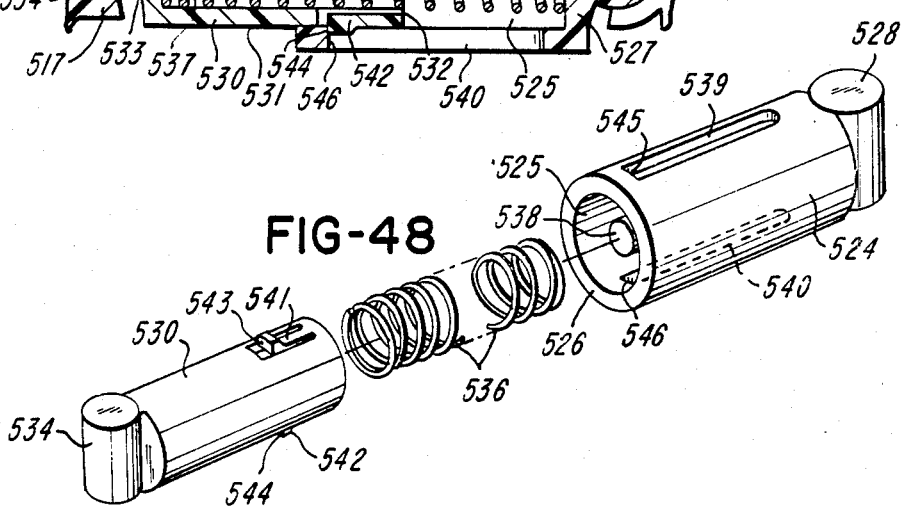

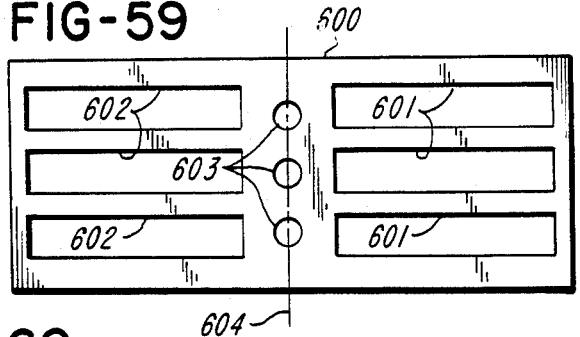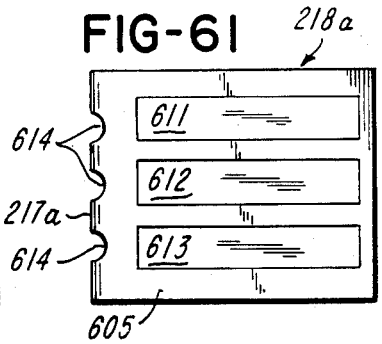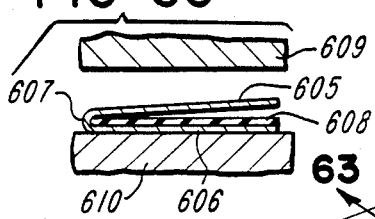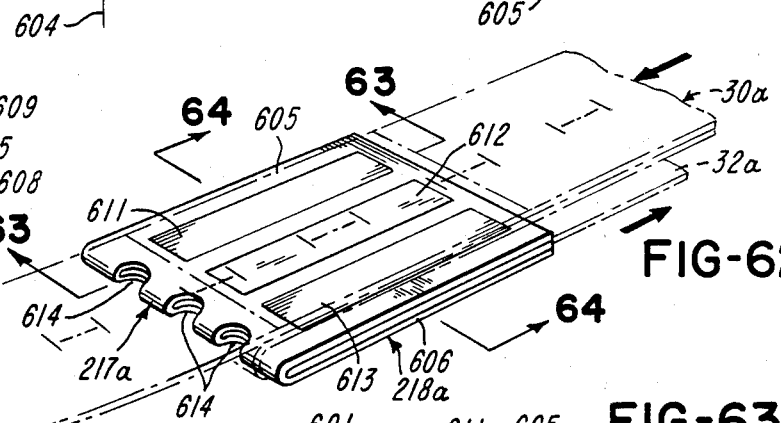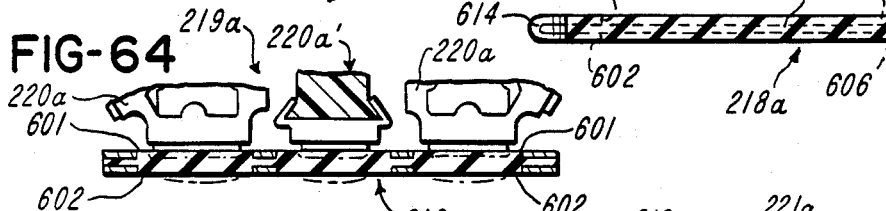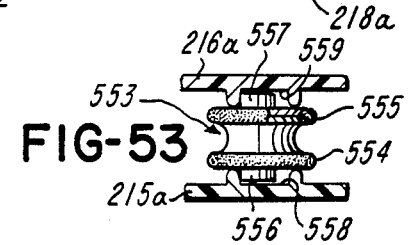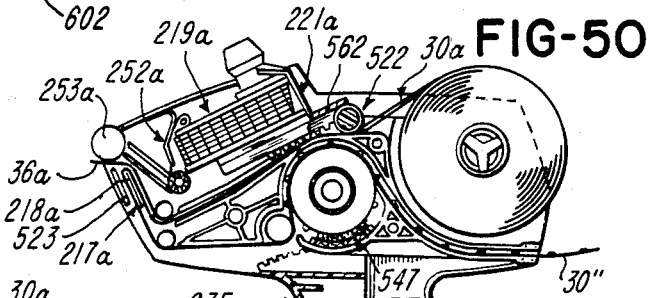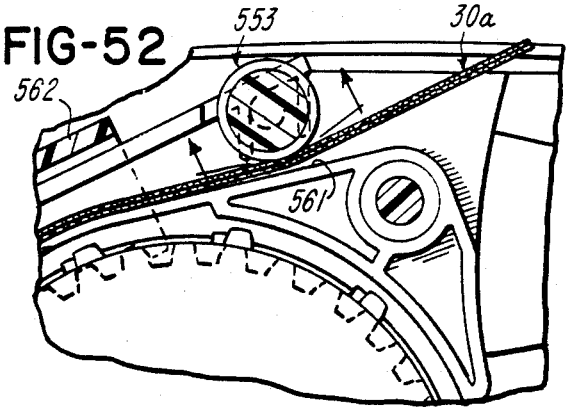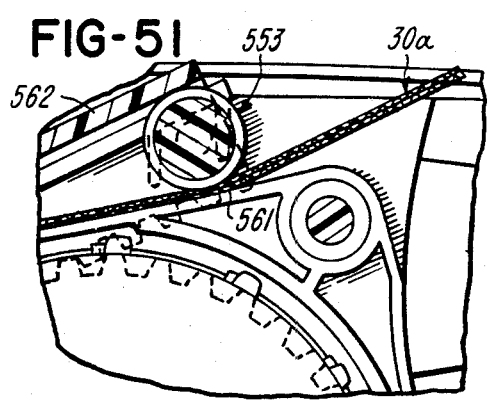

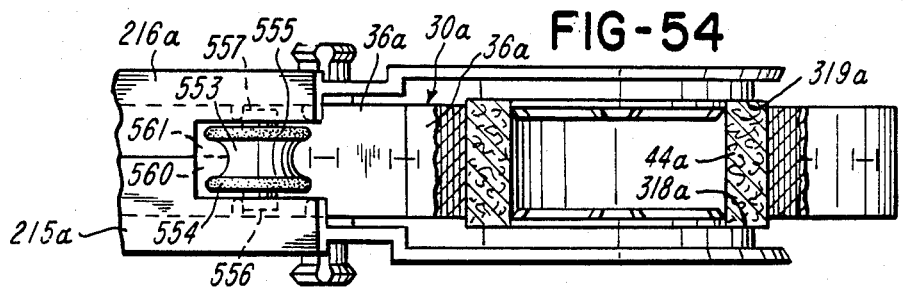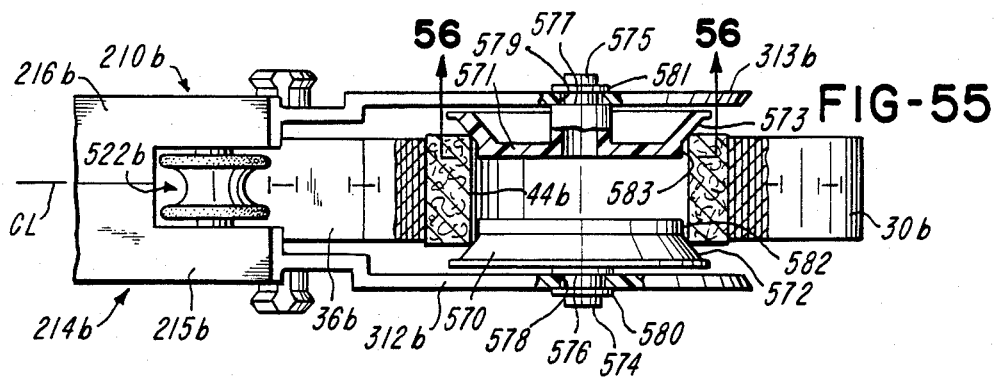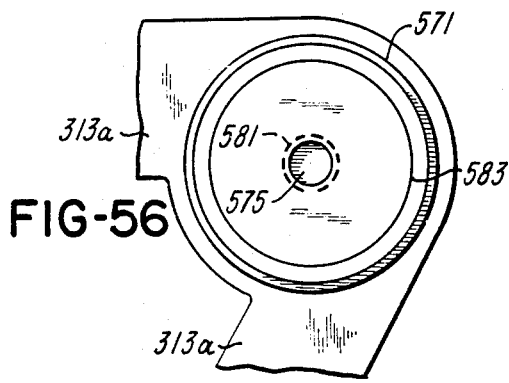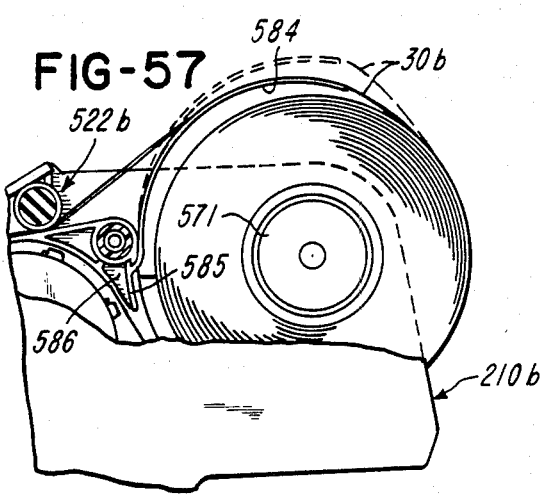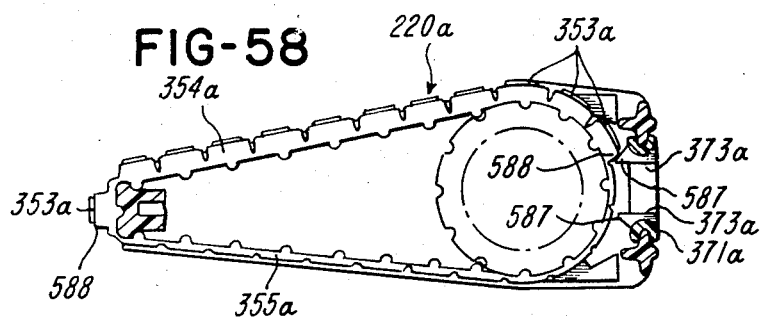

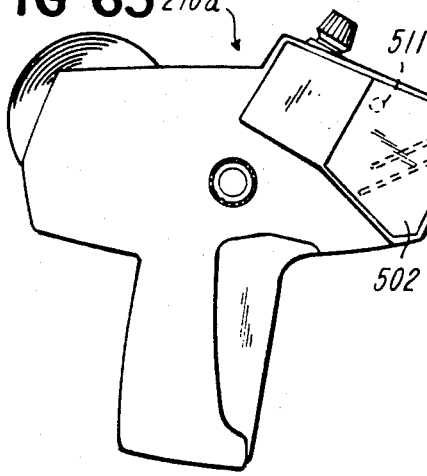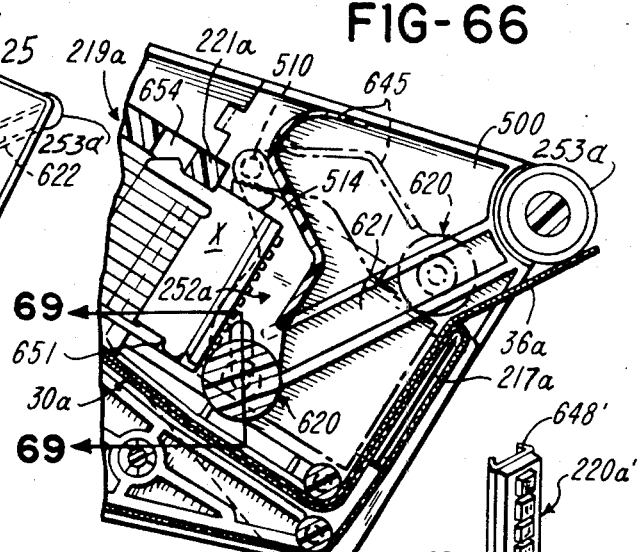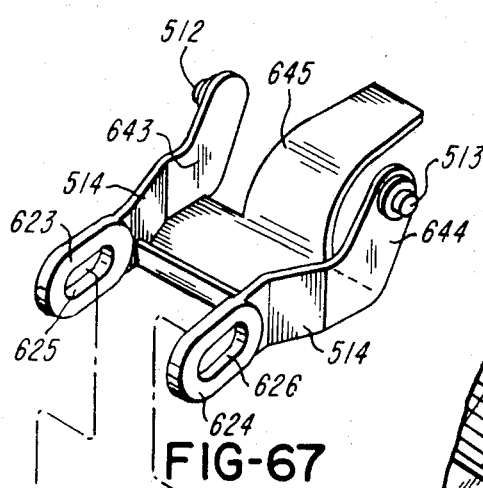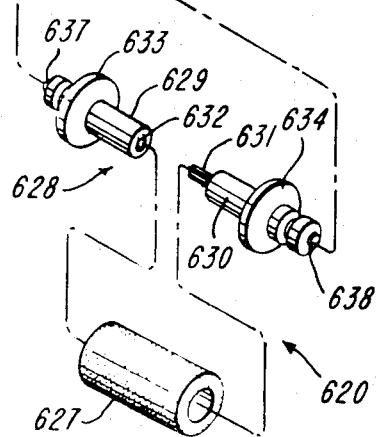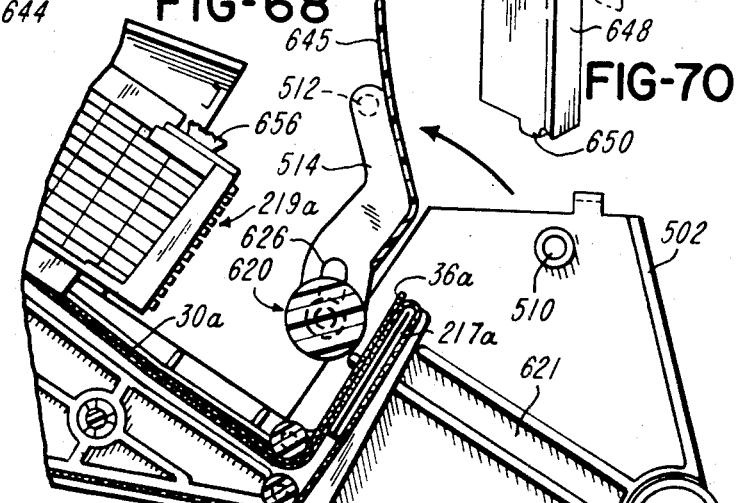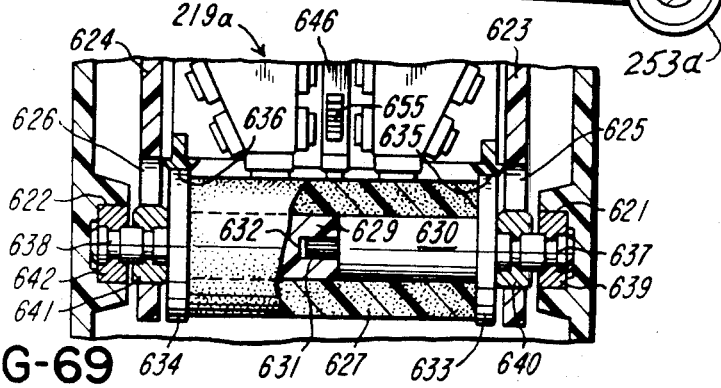

LABELER WITH INKING MECHANISM

CROSS-REFERENCE TO RELATED APPLICATIONS

This is a continuation of copending application Ser. No. 193,553, filed Oct. 3, 1980, now abandoned, which is a division of patent application Ser. No. 653,403, filed Jan. 29, 1976, now U.S. Pat. No. 4,249,973, issued Feb. 10, 1981, which is a division of patent application Ser. No. 540,051, filed Jan. 10, 1975, now U.S. Pat. No. 3,952,652, issued Apr. 27, 1976, which is a division of patent application Ser. No. 312,454, filed Dec. 6, 1972, now U.S. Pat. No. 3,968,745, issued July 13, 1976 which is a continuation-in-part of copending patent application Ser. No. 208,035 filed Dec. 8, 1971, now abandoned. Certain subject matter disclosed in the present application is claimed in U.S. application Ser. No. 205,854 filed Dec. 8, 1971, now U.S. Pat. No. 3,968,106 U.S. application Ser. No. 206,061 filed Dec. 8, 1971, now U.S. Pat. No. 3,783,083 and which are assigned to the same assignee as the present application.

BACKGROUND OF THE INVENTION

1. Field of the Invention

This invention relates to the art of pressure sensitive labels, method and apparatus for making and using same, and label printing and applying machines.

2. Brief Description of the Prior Art

Various U.S. Pat. Nos. 1,642,387, 2,259,358, 2,275,064, 2,502,257, 2,516,487, 2,620,205, 2,656,063, 3,051,353, 3,265,553, 3,343,485, 3,440,123, 3,501,365, 3,551,251, and 3,611,929 are made of record.

SUMMARY OF THE INVENTION

The invention relates to improved means for selectively setting and detenting printing members using a shiftable and rotatable selector for selectively changing the settings of any of the printing members. The selector has a drive element and a yieldable detent element. The drive element and the detent element are located on the selector such that when the drive element is in engagement with the selected driven element the detent element is in detenting position in contact with at least one driven element. In one embodiment, the driven elements can comprise wheels about which respective flexible printing bands are trained. In this embodiment the selector can be in driving engagement with one of the driven wheels and can be shifted into driving engagement with any of the remaining wheels to set the printing bands to print the desired data on a record such as a ticket, tag, or label. The detent element engages either in a recess between adjacent wheels or in a groove or recess in one of the wheels. In another embodiment the printing members comprise print wheels, the hub of each of which comprises a driven member. The selector is detented in the same manner.

Invention also resides in the provision of a simple, low-cost platen which terminates at a peel edge, for use with the label printing and applying apparatus of the invention. The platen is formed from an inversely-bent metallic plate to provide a pair of side-by-side plate portions joined by an inversely-bent portion having a small radius and defining a peel edge. Printing is accomplished when the print head moves into printing relationship with a label positioned on the platen, and the printed label is delaminated from a web of supporting material by the peel edge. In a specific embodiment the plate portions are substantially co-extensive and are secured to each other by weldments.

The invention also comprises an inker or inking mechanism cooperable with printing means in the form of a print head. The inker comprises a one-piece inker body and an ink roller rotatably mounted by the inker body. The ink roller comprises a hub snap-fitted into the inker body and an ink receptive roll on the hub. The hub comprises a pair of hub sections. There is a stub end on each hub section and a flange on each hub section inboard of the stub end. A porous ink receptive tubular roll is mounted between the flanges of the hub sections. The stub ends of the ink roller are snap-fitted into the inker body. The inker body is mounted for relative movement with respect to the printing means. The inker body includes an integrally formed resilient flexible finger for urging the ink roll into cooperation with the printing means.

The invention also comprises an applicator by which labels or the like can be applied to merchandise. The applicator includes at least one and preferably a plurality of wheels. Labels are advanced into label applying relationship with respect to the applicator. The wheels are mounted for independent rotational and independent resilient yielding movements. Specifically, each wheel has an annular rim which carries an O-ring having a high-coefficient of friction. A plurality of flexible resilient arms formed integrally with the rim are engaged with a mounting shaft. While the label is being applied, the arms deflect resiliently to allow the individual wheels to yield independently. This feature is particularly useful in applying labels to merchandise with irregular surfaces.

It is a feature of the invention to provide an apparatus for printing and applying labels, in which a composite web of labels is carried in roll form and in which labels are successively printed by printing means and the printed labels are substantially delaminated by delaminating means and are applied by applying means. In the event the labels in the composite web are not completely separated from each other, application of one label will cause an excessive amount of the composite web to be paid out of the roll, thereby causing some loss of registration in the printing of the next successive label. It is known in the art to apply braking force to the composite web upstream of the delaminating means to prevent excessive amounts of composite web from being paid out of the roll, but such brakes involve linkages which are relatively costly and complicated. By controlling a brake directly from the print head the brake structure is relatively simple in construction, yet automatic in operation.

It is another feature of the invention to provide selectable printing members and means for limiting the amount of movement of the printing members. Each printing member, which is either of the endless type band or type wheel type, has a printing section and a human readable section. Stop means is provided to prevent the human readable section of the printing member from being advanced to the printing zone at which it could be inked by inking means. Such inking would obscure the readability of the human readable portion.

It is another feature of the invention to provide a compact, modular, spring assembly for a hand-held machine such as a labeler. A specific embodiment of the spring assembly comprising a spring assembly having a sleeve, a plunger slidably received in the sleeve, a spring acting on both the sleeve and the plunger, and means providing a snap-fit connection between the sleeve and the plunger.

It is also a feature of the invention to provide an apparatus for printing and dispensing pressure sensitive labels having a delaminator and a feed wheel having teeth engageable with the supporting material downstream of the delaminator, together with a lubricant applicator for applying lubricant to the feed wheel to prevent accumulation of adhesive on the feed wheel.

It is another feature of the invention to provide an improved method of making a platen, and to a platen having at least one platen section composed of a flexible resilient material which is supported only at its periphery. The platen section or sections yield resiliently as the label is printed. The platen can also have means providing a delaminating or peel edge which has at least one interruption to reduce the area of contact with the composite label web to consequently reduce friction.

It is a feature of the invention to provide an improved inking mechanism in which the print head drives the inking mechanism, the housing guides and mounts the inking mechanism by means of rollers, and the ink roller of the inking mechanism rolls on the print head during inking.

BRIEF DESCRIPTION OF THE DRAWINGS

FIG. 1 is an exploded perspective view of label printing and applying apparatus for carrying out the method of the invention;

FIG. 2 is a partly broken away top plan view of a composite web useful in the label printing and applying apparatus of the invention;

FIG. 3 is a sectional elevational view of the apparatus shown in FIG. 1;

FIG. 4 is a sectional view taken generally along line 4—4 of FIG. 3;

FIG. 5 is a sectional view taken along line 5—5 of FIG. 3;

FIG. 6 is a sectional view taken along line 6—6 of FIG. 3;

FIG. 7 is a side elevational view of one of the subframe sections of the apparatus;

FIG. 8 is a top plan view taken along line 8—8 of FIG. 7;

FIG. 9 is a side elevational view of the other subframe section;

FIG. 10 is a top plan view showing the manner in which the label core for the roll of labels is held and the manner in which braking force is applied by the subframe sections;

FIG. 11 is a sectional view taken along line 11—11 of FIG. 10;

FIG. 12 is a sectional view taken generally along line 12—12 of FIG. 3;

FIG. 13 is an exploded perspective view of the inking mechanism;

FIG. 14 is an enlarged sectional view showing a fragmentary portion of the apparatus in solid lines, and in particular showing a fragmentary portion of the print head and the inking mechanism in both solid and phantom line positions;

FIG. 15 is a sectional view taken along line 15—15 of FIG. 4;

FIG. 16 is a developed view showing the arrangement of the teeth of the detent mechanism;

FIG. 17 is a sectional view taken along line 17—17 of FIG. 15;

FIG. 18 is a sectional view taken generally along line 18—18 of FIG. 15;

FIG. 19 is a sectional view showing one of the three sets of snap-fit connections used to interconnect the frame and the subframe;

FIG. 20 is an enlarged view of an applicator roll shown mounted in the frame of the apparatus;

FIG. 21 is a sectional view taken along line 21—21 of FIG. 20;

FIG. 22 is a sectional view taken along line 22—22 of FIG. 21, but omitting the shaft and the frictional member;

FIG. 23 is a partly sectional view of the mounting shaft which forms part of the applicator roll;

FIG. 24 is an exploded perspective view of the print head;

FIG. 25 is a sectional view of the print head taken generally along line 25—25 of FIG. 3;

FIG. 26 is a sectional view showing the selector in relationship to the associated driven wheels;

FIG. 27 is an enlarged sectional view showing the manner in which detenting of the selector is effected, but showing the driven members as being of different widths;

FIG. 28 is a view similar to a fragmentary portion of FIG. 26, but showing the manner in which detenting can be effected directly on a wheel;

FIG. 29 is an enlarged, partly sectional, elevational view showing an alternative arrangement for constructing the selector;

FIG. 30 is a perspective view showing the driving member depicted in FIG. 29;

FIG. 31 is a partly exploded perspective view of a modified print head in accordance with the invention;

FIG. 32 is an exploded perspective view of the selector in association with type wheels and mounting structure for the type wheels;

FIG. 33 is an end elevational view of the type wheels and the selector assembled in the mounting members;

FIG. 34 is a sectional view taken generally along line 34—34 of FIG. 33;

FIG. 35 is an exploded perspective view of another embodiment of the label printing and applying apparatus;

FIG. 36 is a partly broken away top plan view of a composite web useful in the apparatus;

FIG. 37 is a sectional view taken along line 37—37 of FIG. 36;

FIG. 38 is a sectional view taken along line 38—38 of FIG. 36;

FIGS. 39 through 44 are diagrammatic views illustrating a method of loading the apparatus;

FIG. 45 is an elevational view, partly in section, showing a fragmentary portion of the actuating means including an operator and a spring assembly, with the operator being in its initial position;

FIG. 46 is an elevational view, partly in section, showing the operator in its operated position;

FIG. 47 is an enlarged sectional view of the spring assembly;

FIG. 48 is an exploded perspective view of the spring assembly;

FIG. 49 is a sectional view taken generally along line 49—49 of FIG. 45;

FIG. 50 is a fragmentary elevational view showing the operating components of the apparatus in their initial positions;

FIG. 51 is an enlarged fragmentary view showing a portion of the apparatus shown in FIG. 50, and showing especially the print head in its operating position with a brake in accordance with the invention;

FIG. 52 is a fragmentary view similar to FIG. 51, but showing the print head out of the operative position with the brake;

FIG. 53 is a sectional view taken along line 53—53 of FIG. 52;

FIG. 54 is a top plan view, partly in section, of a fragmentary portion of the apparatus;

FIG. 55 is a top plan view, partly in section, of a fragmentary portion of a modified apparatus;

FIG. 56 is a sectional view taken along line 56—56 of FIG. 55;

FIG. 57 is an elevational view, partly in section, on a reduced scale from that of FIGS. 55 and 56, showing a spring for assisting the unwinding of a supply roll;

FIG. 58 is a view similar to FIG. 25, but illustrating an improved arrangement by which the human readable section of the printing member is prevented from being moved to the printing zone;

FIG. 59 is a top plan view of a sheet used in making a platen;

FIG. 60 is a diagrammatic sectional view of the sheet after having been inversely bent, together with a piece of moldable material, positioned in a press;

FIG. 61 is a top plan view of the completed platen;

FIG. 62 is a perspective view of the platen showing the composite web by phantom lines;

FIG. 63 is a sectional view taken along line 63—63 of FIG. 62;

FIG. 64 is a sectional view taken along line 64—64 of FIG. 62, but showing additionally printing members in printing cooperation with individual platen sections of the platen;

FIG. 65 is a side elevational view of the apparatus;

FIG. 66 is a fragmentary partly sectional view of the apparatus showing a housing section in the closed position and showing the inking mechanism;

FIG. 67 is an exploded perspective view of an inker body and ink roller of the inking mechanism;

FIG. 68 is a view similar to FIG. 66, but showing the housing section in the open position;

FIG. 69 is a fragmentary view showing the ink roller bearing on the print head and inking the printing members; and FIG. 70 is a perspective exploded view of a slug used with the print head.

DESCRIPTION OF THE PREFERRED EMBODIMENT

Referring now to a label printing and applying apparatus generally indicated at 210 in the embodiment of FIGS. 1 through 27, and initially to FIG. 1, there is shown to be a housing or main frame generally indicated at 211. The housing or frame 211 is specifically shown to include a pair of frame sections 212 and 213. Disposed within the housing 211 is a subframe generally indicated at 214 which comprises a pair of subframe sections 215 and 216. The frame sections 212 and 213 mount a platen 217 which includes a peel edge 218. A pring head generally indicated at 219 is mounted by the subframe 214. More specifically, the print head 219 includes a plurality of selectable settable printing members 220 in the form of endless printing bands mounted by a print head frame 211. Extending from the frame 221 are a pair of flanges 222 and 223. Gear sections or specifically racks 224 and 225 are provided at the ends of the respective flanges 222 and 223. Opposed tracks 226 and 227 are formed on the respective flanges 222 and 223 to receive straight ball bearings 228 and 229. The subframe sections 215 and 216 have respective tracks 230 and 231. The ball bearing 228 is received in the track 226 of the flange 222 and in the track 230, and the ball bearing 229 is received in the track 227 in the flange 223 and in the track 231. The ball bearings 228 and 229 have respective balls 228' and 229' rotatably held by respective tangs or holders 228" and 229". In this manner, the print head 219 is mounted for movement, particularly reciprocating movement, toward and away from the platen 217.

The housing 211 has a handle generally indicated at 232 and particularly each housing or frame section 212 and 213 has a respective handle portion 233 and 234. An operator generally indicated at 235 is shown to comprise a pivotally operated lever 236 pivotally mounted by a post 237 at the lower end of the handle 232. The lever 236 is normally urged in a counterclockwise direction (FIG. 1) by a torsion spring 238 received about the post 237. The pivotal movement of the lever 236 is limited by an adjustable stop block 239 received by the handle 232 between the handle portions 233 and 234. The upper end of the operating lever 235 carries a pair of spaced-apart gear sections 240 and 241. The gear sections 240 and 241 are shown to be in the form of spur gear segments. Gear sections 240 and 241 are in meshing engagement with respective spur gears 242 and 243. The spur gears 242 and 243 are in meshing engagement with respective gear sections 224 and 225 carried by the print head 219.

A roll of pressure sensitive labels, in the form for example of the composite web 30 shown in FIG. 2, is mounted by its core 44 by the subframe 214. As will be described in greater detail hereinafter, the composite web 30 is drawn off the roll into overlying relationship with respect to the platen 217 and the supporting material 32 is engaged by a toothed driver 244. The gear 243 carries an integral pawl 245 cooperable with a ratchet wheel 246 which is coupled to the driver 244 by a detent mechanism generally indicated at 247. An input or drive member 248 of the detent mechanism 247 is shown in FIG. 1. The toothed driver 244 has a plurality of equally spaced apart drive teeth 249 arranged about its outer periphery. The pawl 245 is integrally joined at but one end to the gear 243. The pawl 245 is flexible and resilient and can ride on the ratchet wheel 246 and deflect into engagement with a tooth 265 of the ratchet wheel 246.

The housing or frame section 213 has an access opening 250. A cover 251 is removably connected to the frame section 213 at the access opening 250. The cover 251 mounts an inking mechanism 252 cooperable with the printing members 220 of the print head 219. The housing sections 212 and 213 mount an applicator 253 disposed downstream of the peel edge 218.

Referring to FIG. 2, there is shown composite web 30 of label material 31 releasably adhered to and carried by supporting or backing material 32. The label material 31 is cut transversely by transverse cuts 33 extending all the way across the web 31 of label material to the side edges 34 and 35 of the composite web 30. The cuts 33 known as "butt cuts" separate the web 31 of label material into a series of end-to-end labels 36. The underside of the web 31 of label material has a coating of pressure sensitive adhesive 37 which adheres strongly to the web 31 of label material. The web 32 of supporting material carries a thin film or coating (not shown) which allows the labels to be peeled from the web 32 of supporting material.

Groups 38 of cuts are provided at equally spaced-apart intervals along the length of the composite web 30. Each group 38 of cuts is shown to extend through the supporting material as well as through the label material. Each group of cuts is shown to be made in a generally I-shaped configuration comprised of cuts 39S, 40S and 41S in the supporting material and aligned cuts 39L, 40L and 41L in the label material. The part of the web 32 between the one end of the cut 39S and the cut 40S provides a frangible portion 43S and the part of the web 32 between the other end of the cut 39S and the cut 41S provides frangible portion 42S. In like manner, the part of the label material between the end of the cut 39L and the cut 40L provides a frangible portion 43L and the part between the other end of the cut 39L and the cut 41L provides a frangible portion 42L.

Referring to FIG. 3, the interrelationship of the components of the apparatus 210 is shown in detail. The composite web 30 is paid out of the roll and passes through a passage provided by subframe sections 215 and 216 and specifically by groove 254 (FIG. 9) in the subframe section 215 and a cooperating groove 255 (FIGS. 1, 3 and 7) in the subframe section 216. From there the composite web 30 passes partly around a roll 256 and into overlying relationship with the platen 217. Delamination is effected at the peel edge 218 formed at the end of the platen 217. The supporting material 32 is drawn around the peel edge 218 beneath the platen 217 and passes partly around a roll 257, below the guide 258 and between the toothed driver 244 and the mating die wheel 259. As a tooth 249 moves into mating cooperation with the die wheel 259, the tooth 249 engages the supporting material 32 at the longitudinal cut 39S and effects rupturing or bursting of the frangible portions 42S and 43S, whereupon the tooth 249 which is in mating cooperation with the die wheel 259 (FIG. 18) is considered to have formed a feed hole in the supporting material 242. It is preferred that there be three teeth 249 in driving engagement with the supporting material 32 at all times. The subframe sections 215 and 216 have respective aligned strippers 260 and 261 which facilitate disengagement of the teeth 249 with the supporting material 232 as the driver 244 rotates. Opposed guide grooves 262 and 263 formed in the subframe sections 215 and 216 guide the supporting material 32 to an exit opening 264. Excess supporting material which dangles from the apparatus 210 can be readily torn off at the exit opening 264.

With reference to FIG. 3, the print head 219 is shown by solid lines in the initial or home position and by phantom lines 219' in the printing zone in printing cooperation with the label 36 and the platen 217. The operator 235 is shown by solid lines in its initial or home position and in phantom lines 235' in the fully actuated position. In the fully actuated position, the print head 219 has been moved into printing cooperation with the labels 36 and the platen 217, and the operator 235 is in abutment with the stop block 239. In this position of the operator 235, the flexible resilient pawl 245 (FIG. 15), joined integrally at one end to the gear 243, has moved to the position shown by phantom lines 245' in driving cooperation with a tooth 265 of the ratchet wheel 246. When the user releases the operator 235, the spring 238 (FIG. 3) returns the operator 235 against stop 239' to the solid line position shown in FIG. 3. While the operator 235 is returning to the solid line position from the fully actuated position indicated by phantom lines 235', the gear sections 240 and 241 (FIGS. 3 and 4) rotate gears 242 and 243 clockwise (FIG. 3) to return the print head 219 to the solid line position from the position shown by solid lines 219', and to drive the pawl 245 from the position shown by phantom lines 245' to the position shown in solid lines in FIG. 15. Thus, the pawl 245, which is in line position from the fully actuated position indicated by phantom lines 235', the gear sections 240 and 241 (FIGS. 3 and 4) rotate gears 242 and 243 clockwise (FIG. 3) to return the print head 219 to the solid line position from the position shown by solid lines 219' and to drive the pawl 245 from the position shown by phantom lines 245' to the position shown in solid lines in FIG. 15. Thus, the pawl 245, which is in engagement with a tooth 265, drives the ratchet wheel 246 counterclockwise (FIG. 15). This counterclockwise rotation of the ratchet wheel 246 (FIG. 15) causes the driver 244 to advance the supporting material 32 to effect substantially complete delamination of a label at the peel edge 218. Counterclockwise rotation of the ratchet wheel 246 continues until a pawl 266 (FIGS. 1, 7 and 15) in the form of a flexible resilient appendage of the subframe section 216, moves into engagement with a tooth 265 of the ratchet wheel. This prevents the web of supporting material 32 from being accidentally moved in the return direction.

As best shown in FIG. 4, the driver 244 has an annular rim 267 joined to a hub 268 by a radial web 269. The hub 268 has a hub section 268' extending in one direction and another hub section 268'' extending in the opposite direction. The hub section 268' terminates at a knob 270, and the hub section 268'' terminates at a knob 270'. The gear 242 is rotatably journaled on and with respect to the hub section 268'. The gear 242 has a hub or flange 271 which is rotatably journaled in opening 272 in the frame section 212. The hub section 268' extends through an enlarged opening 273 in the subframe section 215. The hub section 268'' provides a stepped pair of bearing surfaces 274. The ratchet wheel 246 is formed integrally with the drive member 248 of the detent mechanism 247. The ratchet wheel 246 and the drive member 248 have a hub 276 with a stepped bore 275 into which the hub section 268'' extends. A hub 276 rotatably receives and mounts the gear 243. The gear 243 has a hub 277 rotatably received in a bearing 278 formed integrally with the housing section 213. As seen in FIG. 4, the gears 242 and 243 are in driving engagement with respective gear sections 224 and 225 carried by the print head 219; the relative position of the drive pawl 245 to the ratchet wheel 246 is also shown.

With reference to FIG. 15, the drive member 248 includes a plurality of spring fingers or detent pawls 278. The pawls 278 are of equal length, are flexible and resilient, and are continuously urged against teeth 279 formed on the inside of the annular rim 267. In the illustrated embodiment there are one hundred and seventy-seven teeth 279 at equally spaced-apart intervals. There are twelve pawls 278 integrally connected to the hub 276 at equally spaced-apart intervals. The teeth 279 comprise respective tooth faces 280 and a recess between adjacent tooth faces 280 in which the end of a pawl 278 can be received. The pawls 278 drive the feed wheel 244 in a driving direction (counterclockwise in FIG. 15) but can move in a non-driving direction (clockwise in FIG. 15) relative to the feed wheel 244 by manually operating the detent mechanism 247. Accordingly, every fifth pawl 278 is engaged with the face 280 of a tooth 279. The pawls 278 between every fifth set of pawls are out of engagement with their respective tooth faces 280 by different increments as best illustrated in FIG. 16. Normally, the pawls 278 hold the ratchet wheel 246 and the feed wheel or driver 244 in fixed relationship with respect to each other. With reference to FIG. 15, as the drive pawl 245 moves counterclockwise the ratchet wheel 246 is driven counterclockwise and the three pawls 278 which are in driving engagement with their respective tooth faces 280 will drive the feed wheel 244 counterclockwise. Accordingly, there is no relative rotation between the ratchet wheel 246 and the feed wheel 244. Should it be desired to change the position to which the labels are advanced by the feed wheel 244 upon actuation of the operator 235, the user will grasp the knobs 270 and 270' and will rotate the knob 270' counterclockwise (FIG. 1) relative to the knob 270. This will cause the input member 248 to rotate (counterclockwise in FIG. 1, clockwise in FIG. 15) relative to the feed wheel 244 so that the next three successive teeth move into engagement with the next three respective tooth faces 280. For example, if it is considered that first, fifth and ninth pawls 278 were initially in engagement with respective teeth 279, only a very slight rotation will cause second, sixth and tenth pawls to move into engagement with their respective tooth faces 280, and so on. Although any desired number of pawls 278 and teeth 280 can be used, the illustrated embodiment provides very minute adjustment of the feed wheel 244 relative to the platen 217 and the peel edge 218 and the arrangement of teeth 280 and cooperating pawls 278 causes the entire input or drive member 248 to be centered within the annular rim 267. With respect to the printing function, adjustment of the detent mechanism 247 changes the position relative to the printing zone between the print head 219 and the platen 217 to which a label 36 is advanced. With respect to the delaminating function, operation of the detent mechanism 247 also changes the position to which the label 36 is advanced. Accordingly, it is apparent that the detent mechanism 247 is useful both in establishing the position to which a label is advanced relative to the printing zone and to the delaminating zone. It is important that just the correct amount of trailing marginal end edge of the label remain adhered to the peel edge so that the label 36 is held in that position until it is ready to be applied to merchandise by the applicator 253.

As best shown in FIGS. 15, 17, and 18, the supporting material 32 is initially brought into engagement with the feed wheel 244 as it passes around the die wheel 259. The die wheel 259 is comprised of an annular plastic roll 281 journaled by subframe sections 215 and 216. The roll 281 has frictional members in the form of rubber O-rings 282 received at spaced-apart locations about the periphery of the roll 281. The O-rings straddle the teeth 249 and are just spaced apart far enough to act as a die wheel with mating teeth 249. As a tooth 249 begins to engage the web of supporting material 32 at the cut 39S (FIG. 2), the die wheel 259 cooperates with the tooth 249 to hold the supporting material 32 on each side of the group 38 of cuts in intimate contact with the outer surface of the feed wheel 244 as best shown in FIG. 18. This insures that the tooth 249 properly bursts or forms a hole, facilitated by the group 38 of cuts, in the supporting material 32 and that the drive face of the tooth 249 is in driving engagement with the leading cut 41S. When the first tooth 249 registers with the group 38 of cuts in the supporting material 32 the composite web 30 is properly registered with the printing zone and the delaminating zone. Once such registration is accomplished as the result of the tooth 249 cooperating with the die roll 259, correct registration continues.

The platen 217 and the peel edge 218 (FIGS. 1, 3 and 4) are formed from an inversely-bent plate having a pair of side-by-side plate portions 283 and 284 joined by an inversely-bent portion 285. The inversely-bent portion 285 has a small radius and defines the peel edge 218. The plate portions 283 and 284 are co-extensive and are secured to each other by weldments 286. The plate which forms the platen 217 and the peel edge 218, received in recesses 286' in subframe sections 215 and 216, is preferably constructed of highly polished stainless steel. The sides of the plate that forms the platen 217 and the peel edge 218 are received in opposed recesses 286' in the subframe sections 215 and 216. A label stopper is provided by a pair of aligned plates 218' formed integrally with the subframe sections 215 and 216. The plates 218' are disposed beneath but are spaced from the plate 217. Should a label 36 attempt to fall onto the supporting material 32 after being delaminated at the peel edge 218, the labels 36 will be caught by the plates 281'. This will prevent any label 36 from continuing along the path through which the supporting material 32 passes after passing the peel edge 218.

With reference to FIG. 3, the stop block 239 is shown to be slidable on a stop surface 287. The stop block 239 has a threaded bore 288 which threadably receives an adjusted screw 289. One half of the screw 289 is rotatably received in a semi-circular groove 290 and one-half of the head 291 of the screw 289 is captive in a semi-circular recess 292 in the seat 293. The handle portion 233 of the frame section 212 provides another stop surface (not shown) for the stop block 239 in alignment with the stop surface 287, another semi-circular groove (not shown) opposite the groove 290 for receiving the other one-half of the screw 289, and another semi-circular recess (not shown) opposite the recess 292 for receiving the other one-half of the head 291. A hole 294, one-half of which is formed by each handle portion 233 and 234, enables entry of a tool (not shown) by which the head 291 of the screw 289 can be engaged to rotate the screw 289. Rotation of the screw in one direction will cause the stop block 239 to move upwardly (FIG. 3) and rotation of the screw 289 in the opposite direction will cause the stop block 239 to move downwardly (FIG. 3). It is apparent that adjustment of the position of the stop block 239 will adjust the limit of the travel of the operator 235.

With reference to FIG. 13, the inking mechanism 252 is shown to comprise a one-piece inker body 295 having an aligned pair of sockets 296 having converging openings 297. The sockets 296 extend for more than 180° so that the ink roll 298 can be snapped into the sockets 296. The inker body 295 has a pair of aligned projections 299 which are capable of being snapped into sockets 300 (FIG. 1) in the cover 251. The sockets 300 are shaped like the sockets 296. The inker body 295 has an integrally formed leaf spring or spring finger 301 which is shown in FIG. 14 to be urged against the cover 251. The spring finger 301 normally urges the inking mechanism 252 into the solid line position shown in FIG. 14.

The ink roller 298 is shown in FIG. 14 to be in the path of but slightly spaced from the print head 291 because in that position the inker body 295 contacts the frame 221 of the print head 219. When the pring head 219 is moved from the solid line position to the phantom line position, the ink roll 298 applies ink to the printing bands 220 and the entire inking mechanism 252 pivots about projections 299 to the position shown in phantom lines. When the print head 219 returns to the solid line position shown in FIG. 14, the spring finger 301 returns the inking mechanism 252 to the solid line position.

With reference to FIG. 13, the ink roller 298 is shown to comprise a pair of hub sections 302 and 303. The hub section 302 has an elongated projection 304 at one end and a stub end 305 at its opposite end. The hub section 302 has an annular flange 306 between the stub end 305 and a reduced portion 307. The reduced portion 307 is disposed between the flange 306 and the projection 304. The other hub portion 303 has an annular flange 308 disposed between a reduced portion 309 and a stub end 310. The reduced portion 309 has a bore 304' into which the projection 304 is adapted to be press-fitted. The projection 304 has straight flutes which serve to lock the hub portions 302 and 303 together. An ink-receptive tubular porous roll 311, composed for example of rubber or the like, is received on the reduced portions 307 and 309 of respective hub sections 302 and 303. The flanges 306 and 308 abut the ends of the roll 311 and prevent the roll 311 from shifting.

With reference to FIGS. 7, 8 and 9, the subframe sections 215 and 216 are shown to have respective integral leaf springs 312 and 313. The leaf springs 312 and 313 are provided with integral annular brake members 314 and 315 having respective annular brake surfaces 316 and 317. Brake members 314 and 315 are formed integrally with projections or hubs 318 and 319, surfaces 318' and 319' of which are received in and mount label core 44. The brake surfaces 316 and 317 cooperate to exert braking forces on the label core 44. Neither the hubs 318 and 319 nor the brake members 314 and 315 contact the composite web 30 which is wound on the label core 44. In this manner, any gum or adhesive that may exist at the marginal side edges of the composite web 30 will not be transferred to the brake surfaces 316 and 317. FIG. 10 illustrates, in exaggerated form, by phantom lines, the initial positions of the leaf springs 312 and 313, the brake members 314 and 315 and the hubs 318 and 319. The initial canted position of the leaf springs 313, the brake members 315 and the hub 319 relative to the remainder of the subframe section 216 is also shown in FIG. 8. Insertion of the label core 44 onto the hubs 318 and 319 will cause the leaf springs 312 and 313 to flex outwardly and the brake surfaces 316 and 317 will exert a predetermined braking force on the ends of the core 44. The braking force applied to the core 44 will insure that there is tension in the web 32 of supporting material from the label roll to the printing zone, to the peel edge 218, and to the toothed driver 244. As the pawl 266 (FIG. 15) prevents the reverse rotation of the driver 244, it is seen that the apparatus maintains a slight but desirable amount of tension on the web of supporting material 32 at all times.

The frame 211 comprises an essentially closed shell but the rear part provides an access opening 211' through which a roll of labels can be inserted and a spent core 44 can be removed without even partial disassembly of the apparatus 210.

With reference to FIGS. 20 through 23, there is shown the applicator 253 mounted by the frame 211. The applicator 253 comprises a hub 320 shown to have four annular generally V-shaped grooves 321 in which respective wheels 322 are rotatably mounted. The hub 320 also has a pair of annular flanges 323 disposed between the set of three wheels 322 and the remaining wheel 322. The wheels 322 have greater diameters than the flanges 323. The ends of the hub 320 beyond the grooves 321 are stub ends 324. Undercuts 325 inboard of the stub ends 324 enable the hub to be retained in cooperating yieldable sockets 326 and 327 in frame sections 212 and 213. The sockets 326 and 327 are comprised of a plurality of separate socket sections or flexible resilient fingers 328 and 329 to enable the stub ends 324 to be snapped into place. The sockets 326 and 327 and the cooperating stub ends 324 provide opposed snap-fit connections.

The wheels 322 are identical so only one is described in detail. Each wheel 322 is comprised of an annular rim 330 having an annular groove 331 in its outer periphery. A rubber O-ring 332 is received in the groove 331. A plurality of equally spaced-apart arms 333 formed integrally with the rim 330 have generally V-shaped bearing sections 334 received in the respective groove 321. The bearing sections 334 of the arms 333 exert forces against the hub 320, but enable the wheel 322 to rotate relative to the hub 320 and enable the wheel 322 to yield as a label 36 is being applied to the merchandise.

As the rubber O-rings 332 have a high coefficient of friction, rotation of the wheels 322 during label application is facilitated. The spacing of the wheels 322 allows the applicator 253 to press the label 36 onto the merchandise without contacting the printing which was applied to the labels 36 by the print head 219. As the label is pressed onto the merchandise, the arms 333 allow the wheels to yield. This yielding action is particularly useful when applying labels to merchandise having irregular surfaces in that the wheels 322 are mounted for both independent rotational and independent yielding movements with respect to each other. The flanges 323 prevent the adjacent wheels 322 from deflecting more than a small amount away from the perpendicular with respect to the hub 320.

Referring to FIG. 24, there is shown an exploded view of the print head 219. The print head frame 221 is shown to comprise a side plate 335 to which the flanges 222 and 223 are joined. A mounting block 336 is molded integrally with the side plate 335. The block 336 has a platen or pressure member 337 and arcuate mounting surfaces 338. The mounting block 336 also has a socket 339 for receiving a projection 340 of the other side plate 341. A post 342 is formed integrally with the side plate 335 in axial alignment with a hole 343 in the side plate 341. A pair of posts 344 formed integrally with the side plate 335 have hooks 345 which engage shoulders 346 of the side plate 341. The side plate 341 has projections 347 which are adapted to fit under projections 348 on the block 336. When the projections 347 are positioned underneath the projections 348, that is, between the projections 348 and the side plate 335, the projection 340 is received in the socket 339, and when the hooks 345 are in engagement with shoulders 346, then the frame 221 is securely but releasably locked together.

The printing bands 220 are mounted in the frame 221 as best shown in FIG. 25. The printing bands 220 are urged against the support or pressure member 337 and are detented because teeth 349 formed on the underside of each of the printing bands 220 are in engagement with notches 350 formed on the side of the support 337. In this position, the projection 340 is shown received in the socket 339, the printing bands are trained partially around driven members in the form of wheels 351, the printing bands 220 are under slight tension, and the wheels are cradled in and rotatable on the mounting surfaces 338. The wheels 351 have notches 352 in which the teeth 349 are received.

Each printing band 220 has a plurality of printing blocks 353. The different printing blocks 353 of each printing band 220 can print different data, as is conventional. The printing blocks 353 are contained in a printing section 354 of the printing band 220. The printing band 220 also contains a non-printing human readable section 355. The human readable section 355 contains human readable indicia. The user knows what data the printing block 353 at the pressure member 337 will print by peering through a window 356.

It is often desirable to change the data which the print head 219 is to print. This is generally accomplished by advancing the printing head 220 to the printing position in which the selected data will be printed on the label. A selector, generally indicated at 357, has a knob 358 and a shaft or tubular portion 359 received by the post 342. The selector 357 is freely rotatable about the post 342 and is movable axially so that its driving members or lugs 360 can be shifted into driving cooperation with any one of the driven members 351. Each driven member 351 has a central hole 361 which is provided with a plurality of notches 362 for receiving respective lugs 360. Each driven member 351 is also chamfered at the central hole 361 as best indicated at 363. In addition to the driving lugs 360, the selector 357 is shown to have a pair of opposed pawls or spring detent fingers 364, the ends of which engage the recesses provided by the chamfering 363. The detent fingers 364 serve to hold the selector 357 in the axial position to which it is manually shifted, but enable the selector 357 to be shifted to any desired position so that its driving members 360 will be in driving engagement with the selected driven member 351. Accordingly, by shifting the selector 357, any one or all of the driven members 351 can be rotated, one at a time, which results in the respective printing bands or bands 220 being selectively moved to the selected position to print the selected data on the labels.

The driving lugs 360 are spaced slightly from the ends of the recesses or notches 362. Should the user attempt to turn the knob 358 so as to apply excessive torque to the selector 357, the driving lugs 360 will deflect and move out of the set of notches 362 in which they are positioned in the driven member 351 and will move into the next set of notches 362 in the same driven member 351. Accordingly, there will be relative rotation between the selector 357 and the driven member 351 in which the lugs 360 are received.

There is a spacer 365 between each of the driven members 351 and bands 220. Each of the spacers 365 has a pair of lugs 365' which engage around the ends 366 at the ends of the mounting surface 338.

The selector 357 is provided with an annular groove 367 adjacent the knob 358. An indicator, generally indicated at 368, has a split collar 369 with a projection 370 received in the groove 367. The indicator 368 has a rectangular section 371 which defines the window 356. The posts 344 have tongues or guides 344' which are in engagement in grooves 372 in the rectangular section 371. A pair of pointers 373 disposed on the inner surface of the rectangular section 371 are in alignment with the lugs 360 on the selector 357. Accordingly, the pointers 373 indicate the position of the lugs 360 so that if the selector 357 is not in position to drive the desired driven member 351 and its associated printing band 220, the selector 357 can be shifted to a position in which the lugs 360 are in driving engagement with the desired driven member 351 to advance the associated printing band 220 to the selected position.

As shown in FIG. 24, the side plate 341 has a projection or lug 374 by which the printing head 219 is guided by the frame sections 212 and 213 by respective guides 375 and 376 (see FIGS. 1, 3, 14).

The housing or frame sections 212 and 213 are connected by identical snap-fit connections including generally snap-shaped flexible resilient members 377 arranged along the periphery of the housing section 212 and engaged in undercut recesses 378 in the housing section 213. One of these snap-fit connections is shown in detail in FIG. 5.

The subframe sections 215 and 216 of the subframe 214 are connected to each other and the frame sections 212 and 213 of the frame 211 are connected to the subframe 214 by means of three sets of identical snap-fit connections generally indicated at 379, one of which is shown in detail in FIG. 19. With reference to FIG. 19, the frame sections 212 and 213 have respective sockets 380 and 381 comprised of a plurality of respective flexible resilient fingers 382 and 383. The subframe section 215 has a projection 384 snap-fitted into the socket 380. The projection 384 has a plurality of flexible resilient spring fingers 385. The subframe section 216 has a projection 386 comprised of a plurality of flexible resilient fingers 387 snap-fitted into the socket 381. The subframe section 215 has a projection 388 comprised of a plurality of flexible resilient spring fingers 389 received in a socket 390. The socket 390 is comprised of flexible resilient spring fingers 391. A projection 392 formed integrally with the frame section 212 extends through the socket 380, through the projection 384, and to about the end of the projection 388 in the socket 390. The spring fingers 383 of the socket 381 are made thinner and consequently more flexible than the spring fingers 383 of the socket 380. An attempt to open up the frame 211 by separating the frame sections 212 and 213 will cause the frame section 213 to be separated from the subframe section 216. The frame section 212 will remain connected to the subframe 214. As the frame section 213 is being separated from the subframe 214, the projection 392 prevents the subframe sections 215 and 216 from separating because the spring fingers 389 cannot deflect inwardly because of the interference provided by the projection 392. Once the frame section 213 has been removed, the inside of the apparatus 218 is exposed. It is apparent that accidental unsnapping of the subframe 214 or the frame section 212 from the subframe 214 is obviated by this construction. Further disassembly can be accomplished by deliberately unsnapping the subframe 214 from the frame section 212. This is accomplished by moving the projection 384 out of the socket 380. When this has been accomplished, the projection 392 has moved out of the space between the spring fingers 389 of the projection 388 and consequently the subframe sections 215 and 216 can be separated.

With reference to FIGS. 7 through 9 for example, the subframe section 216 is shown to have four projections 393 which are adapted to be snugly received in recesses 394 at the end of the guide 262. The projections 393 received in the holes 394 assist in removably holding the subframe sections 215 and 216 together.

With reference to FIGS. 1 and 14 the cover 251 is shown to have an L-shaped flange 395 at one end and a projection 396 at its other end. To attach the inking mechanism 252 to the apparatus, the projection 395 is pushed under a shoulder 397 of the frame section 213 and thereafter the cover 251 is snapped into position by causing the projection 396 to snap under a lip 398 of the frame section 213. In this manner, the inking mechanism or inker 252 is removably mounted to the apparatus. To remove the inking mechanism, the user can engage his fingernail beneath an extension 399 of the cover 251, thereby causing the projection 396 to snap around the lip 398.

With reference to FIG. 6, the operator 235 is shown to pivot on the pin 237. It is preferred to pivot the operator 235 at the lower end of the handle 232 in that the user's strongest fingers, namely his index, middle and ring fingers engage the operator 235 at substantial distances from the pivot pin 237, while the user's relatively weak little finger is close to the pivot pin 237. The ends of the pin 237 are undercut as indicated respectively at 403 and 404. The ends 401 and 402 are received in sockets 405 and 406 in respective frame sections 212 and 213. The sockets 405 and 406 are comprised of respective flexible resilient fingers 407 and 408. The operator 235, as best shown in FIGS. 3 and 4, is shown to be generally U-shaped in section. Legs 409 and 410 are shown to be rotatably received about the pin 237. The spiral or torsion spring 238 is shown to be received on pin 237 between the legs 409 and 410. If it is desired to remove the frame section 213, the frame section 213 is moved relatively away from the frame section 212 causing the socket 406 to move out of snap-fit engagement with the end 402. Only when the operator 235 is moved away from the frame section 212 can the end 401 move out of the socket 405 because of interference caused by leg 409. This construction obviates accidental disconnection of the pin 237 from the frame sections 212.

With reference to FIG. 28, there is shown an alternative construction by which a selector 357a having a plurality of driving lugs 360a like the lugs 360 and also having a pair of opposed pawls 364a, selectively controls the setting of a selected driven member or wheel 351a. The embodiment of FIG. 28 differs from the embodiment of the print head 219 shown for example in FIGS. 24 through 28 in that each of the driven members 351a is provided with an internal annular groove 411 and the chamfering 363 (FIG. 27) is omitted. Accordingly, instead of having the pawl 364a engage between adjacent driven members 351 as shown in FIGS. 26 and 27 for example, the pawls 364a engage in the groove 411 of one of the driven members 351a, and as is preferred in the groove 411 of the same wheel with which the lugs 360a are in driving engagement. By this construction, the driving function as well as the detenting function are accomplished by the selector 357a in cooperation with a single driven member 351a.

FIG. 27 is actually an alternative embodiment which shows the detenting of one of the pawls 364 in recesses or grooves provided by beveling or chamfering 363. FIG. 27 shows one of the wheels 351 as wider than the adjacent wheel 351 to show that the selector 357 in accordance with the invention can work equally well with wheels 351 of different sizes without affecting detenting. With such a construction some of the printing bands 220 can be wider than others as is highly desirable in some applications.

With reference to FIGS. 29 and 30, there is shown another embodiment of a selector generally indicated at 357b. The selector 357b is the same as the selector 357 in that it has four drive lugs 360b, and a pair of opposed pawls 364b. The selector 357b differs from the selector 357 only in that the selector 357 is of one-piece construction and the selector 357b is of two-piece construction. The selector 357b comprises body sections 412 and 413 snap-fitted together. The body section 412 has a non-circular hole, and in particular a square hole 414, and the body section 413 has a corresponding square portion 415 received in the hole 414. By this construction, the body sections 412 and 413 are incapable of rotating relative to each other. The body section 413 has four flexible resilient fingers 416 terminating at projections 417 shown in FIG. 29 to be received over a bead 418. In this position, an annular flange 419 is in abutment with a shoulder 420 on the body section 412. The selector 357b is used in the same manner as the selector 357. If desired, the selector 357a (FIG. 28) can be made in two parts as illustrated in FIGS. 29 and 30.

Referring to the embodiment of FIG. 31, there is shown a print head generally indicated at 219c having two spaced-apart sets of printing members 220c. The print head 219c has two sets of mounting blocks 366c, two sets of driven members 351c and posts 344c, all formed integrally with side plate 335c. Flanges 222c and 223c and gear sections 224c and 225c are spaced apart wider than the flanges 222 and 223 and gear sections 224 and 225. Accordingly, the pair of gears (not shown) which would mesh with gear sections 224c and 225c would have to be spaced apart by a greater distance than the gears 242 and 243. It is also apparent that ball tracks (not shown) which would correspond to the ball tracks 230 and 231 would have to be spaced wider apart, as would be readily apparent to one skilled in the art. Side plate 341c carries a guide member 374c. The side plate 341c rotatably mounts a pair of selectors 357c for the respective set of driven members 351c. The posts 344c mount respective rectangular sections 371c which provide respective windows 356c. It is readily apparent that with slight modifications the print head 219c can be operated by a mechanism the same in principle and construction as the mechanism which operates the print head 219.

Referring to the embodiment of FIGS. 32, 33 and 34, there is provided a selector 357d which is identical to the selector 357. Printing members take the form of print wheels 220d. Each print wheel 220d is shown to be identical and comprises printing elements 421 carried by an annular hub 422. A mounting and detenting wheel 423 is shown to be formed integrally with each side of the hub 422. The wheels 423 have generally annular outer surfaces 424 received in sockets 425 of adjacent mounting members 426. The sockets 425 comprise an annular portion 427 and a pair of flexible resilient arms 428 formed integrally therewith. Accordingly, the print wheels 220d can be inserted either axially into the sockets 425 or they can be inserted into or removed from the respective sockets 425 by spreading arms 428. Mounting members 426 are provided with recesses 429 in which offset integrally formed detent pawls or spring fingers 430 and 431 are disposed. The pawl 430 of one mounting member 426 is cooperable with notches 430' to effect detenting of an adjacent print wheel 220d on one side of the mounting member 426, and the other is cooperable with notches 431' to effect detenting of the adjacent print wheel 220d on the other side of the mounting member 226.

Each wheel 220d has a central hole 432, the ends of which are chamfered as indicated at 433. As best shown in FIG. 34, pawls 364d are received in the chamfering between adjacent wheels 220d and drive lugs 360d are in driving engagement with the adjacent print wheel 220d. If desired, detenting can be effected in the manner illustrated in the embodiment of FIG. 28.

Referring to FIGS. 35 through 54 and 58 through 70, there is shown an alternative embodiment of the label printing and applying apparatus generally indicated at 210a. In this embodiment, those components which are generally related to those in the embodiment of FIGS. 1 through 34 are indicated by the same reference characters, with the addition of the letter "a". Those components of the apparatus 210a which differ from or are in addition to components in the embodiment of FIGS. 1 through 34 are more specifically indicated with reference characters starting with the number 500.

Referring initially to FIG. 35, the apparatus 210a, which includes a housing 211a, has two-part frame sections generally indicated at 212a and 213a. The frame 211a includes a handle 232a having handle portions 233a and 234a. The frame sections 212a and 213a have relatively movable frame parts 500 and 501, and 502 and 503. The handle portion 232a is a part of the frame part 501, and the handle portion 234a is a part of the housing part 503. A subframe 214a includes subframe sections 215a and 216a. The subframe section 215a and the movable frame part 500 respectively have a socket 504 and a pivot pin 505. Similarily, the subframe section 216a and the movable frame part 502 respectively have a socket 506 and a pivot pin 507. Applicator 253a snaps into sockets 326a and 327a in respective frame parts 500 and 502. The frame parts 500 and 502 and the applicator 253a are pivotal about pivot pins 505 and 506 as a unit with respect to the respective frame parts 501 and 503.

The subframe sections 215a and 216a receive and retain platen 217a which has a delaminator such as a peel edge or turning edge 218a. Print head 219a, having printing members 220a carried by its print head frame 211a, is movable relatively toward and away from the platen 217a. The print head frame 221a has integrally formed racks 224a and 225a and respective tracks 226a and 227a. The subframe section 215a has a track 230a and the subframe section 216a has an opposite track (not shown) for respective ball bearings 228a and 229a.

Frame parts 500 and 502 have respective sockets 510 and 511 in which respective pivot pins 512 and 513 of inker body 514 of an inking mechanism 252a are received. As the print head 219a moves toward and away from the platen 217a, the inking mechanism 252a oscillates first in one direction and thereafter in the opposite direction about its pivot pins 512 and 513 to effect inking of the print head 219a.

The apparatus 210a has an operator 235a in the form of a lever 236a pivotally mounted by a post 237a. Stop block 239a is adjustable by means of a screw 288a received in a threaded bore 288a. The operator 235a is urged away from the stop block 239a by means of a spring assembly 515 which bears at one end against a socket 516 formed partly by handle portion 233a and partly by handle portion 234a and at its other end against a socket 517 (FIG. 47) integral with the operator 235a. Gear sections 240a and 241a carried by the lever 236a are in meshing engagement with respective compound gears 242a and 243a. Specifically, the gear sections 240a and 241a mesh with respective sections 518 and 519, and sections 520 and 521 mesh with respective recks 224a and 225a of the print head 219a. Toothed driver 244a is driven by a pawl 245a which cooperates with a ratchet wheel 246a. Detent mechanism 247a is coupled to the toothed driver 244a. Teeth 249a of the driver 244a engage the supporting material of the composite web in the manner shown and described in the embodiment of FIGS. 1 through 34 and 45. Rolls 256a and 257a guide the composite web 30a and the supporting material web 32a, respectively, and roll 259a cooperates with the toothed driver 244a. The composite web 30a is in the form of a roll carried on a core 44a which can be inserted into the housing through an opening 211a'. The core 44a is mounted by hubs 318a and 319a carried by respective leaf springs 312a and 313a. Annular brake members 314a and 315a exert slight braking forces against only the core 44a.

With reference to FIGS. 36, 37 and 38, the composite web 30a has label material 31a releasably adhered to and carried by supporting or backing material 32a. Label material 31a is cut transversely at longitudinally spaced-apart intervals by transverse cuts 33a. The composite web 30a is like the composite web 30 except that there is an additional group of cuts 38b between groups of cuts 38a. The shapes of the groups of cuts 38a and 38b are identical to each other and to the shape of the cuts of groups 38.

With reference to FIGS. 39 through 44, there is illustrated a method by which either the apparatus 210 or the apparatus 210a can be loaded. In loading the apparatus, for example the apparatus 210a, the composite web 30a in roll form is inserted into the frame 211a into position on the hubs 318a and 319a. While the user holds the labeler 210a in his one hand by means of the handle 233a and depresses the lever 236a slightly to release brake 522, the marginal end portion 30' of the web is inserted through brake 522 into a passageway formed partly by the groove 254a (FIG. 35) and the groove 255a. He now passes the marginal end portion 30' of the composite web 30a partly around the roll 256a and over platen 217a and then between a guide 523 and the applicator 253a. The user then grasps the marginal end portion 30' between the thumb and index fingers of his other hand, and while holding the apparatus 210a in an attitude that will prevent the delaminated labels 36a from coming into contact with and adhering either to the apparatus 210a or to the supporting material web 32a, the composite web 30a is pulled in a direction away from the applicator 253a such that the supporting material 32a is caused to undergo a sharp change of direction as it passes around peel edge 218a at the terminal end of the platen 217a. In that the marginal end portion 30' is pulled in a direction substantially parallel to the platen and the supporting material undergoes a sharp bend of about 180°, in so doing, the supporting material 32a is torn as indicated at 32t as it is forced past the guide 523 and against the underside of the platen 217a and is pulled to the position shown in FIG. 40. The marginal end portion 30' is pulled to a predetermined point 232' at the front tip of the handle 232a so that just the right number of labels 36a are delaminated. The result is that an end section 30" of the supporting material 32a is completely stripped of a plurality (such as about seven) labels 36a. The labels on the end section 30" are readily removed without having to manually remove them one-by-one from the supporting material 32a. If desired, the marginal end portion 30' can be severed from the end section 30" at the tear 32t preferably through one group of cuts 38a in the supporting material web 38a so that the end section which is devoid of labels 36a can be passed between the toothed member 244a and the cooperating die roll 259a, as best shown in FIG. 42. In the position shown in FIG. 42, slackness exists in the end section 30". By manually operating the operator 235a, the end section 30" can be advanced through the apparatus until all the slackness has been removed as best shown in FIG. 43. The apparatus 210a is now ready for use. In this position, each manual operation of the operator 235a will cause a label 36a to be printed and thereafter dispensed to the position shown in FIGS. 43 and 44 in which the trailing edge of the label 36a is still adhered to the supporting material 32a.

Referring to FIGS. 45 through 48, the relationship of the spring assembly 515 to the handle 232a and to the operator 235a is shown in greater detail than in FIG. 35. The spring assembly 515 is shown to have a tubular body or sleeve 524 having a circular cylindrical internal wall 525. One end of the tubular body 524 is open as indicated at 526 and its other end is closed off by an end wall 527. A connector 528 having a circular cylindrical outer surface 529 substantially greater than 180° in extent is formed integrally with the end wall 527. The connector 528 is received by the socket 516 which has a circular cylindrical inner surface 516' slightly greater than 180° in extent. The surface 529 extends transversely with respect to the tubular body 524 and more specifically the axis of the surface 529 extends perpendicularly and through the axis of the tubular section 524. A tubular plunger 530 having a circular cylindrical outer surface 531 is shown to be received in slidable contact with the wall 525 of the body 524. The plunger 530 is open at one end as indicated at 532 and is closed off at its other end by an end wall 533. A connector 534 having a circular cylindrical outer surface 535 substantially greater than 180° in extent is formed integrally with the end wall 533. The surface 535 extends transversely with respect to the plunger 530 and more specifically the axis of the outer surface 535 extends perpendicularly to and through the axis of the plunger 530. The connector 534 is received by the socket 517 which has a circular cylindrical inner surface 517' slightly greater than 180° in extent. A compression spring 536 is received in a bore 537 of the plunger 530 and abuts at one end against the end wall 533. The other end of the spring 536 abuts against the end wall 527 of the body 524. A keeper 538 formed integrally with the end wall 527 extends coaxially within the inside wall 525. The body 524 has a pair of opposed longitudinally extending slots 539 and 540. The plunger 530 has a pair of opposed resilient spring fingers 541 and 542 having respective abutment surfaces 543 and 544. The ends of the slots 539 and 540 constitute stops 545 and 546. In the position shown in FIG. 47, the abutment surfaces 543 and 544 are in abutment with respective stops 545 and 546. In that the plunger 530 is constructed of resilient plastic material, the fingers 541 and 542 can resiliently yield while the spring assembly 515 is being assembled, specifically as the end 532 of the plunger 530 is inserted into the open end 526 of the tubular body 524. As the abutment surfaces 543 and 544 clear the stops 545 and 546 while the plunger 541 is being pushed into the tubular body 524, the spring fingers 541 and 542 first deflect and then spring outwardly to the position shown in FIG. 47. Assembly of the spring assembly 515 is now complete and the tubular body 524 and the plunger 530 can now undergo limited relative movement with respect to each other. The spring assembly 515 is easy to assemble in manufacturing and is easy to install in the apparatus 210a as a modular spring assembly or unit. In that the sockets 516 and 517 are resilient they can expand resiliently to receive respective connectors 528 and 534. During use the spring assembly 515 normally urges the operator 235a to its initial position as shown in FIG. 45. When the operator 235a is operated by the user, the plunger 530 telescopes into the tubular body 524 as best shown in FIG. 46. Upon subsequent release of the operator 235a, the spring assembly 515 returns the operator 235a to its initial position.

With reference to FIGS. 35, 45 and 49, there is shown a lubricant applicator generally indicated at 547. The purpose of the applicator 547 is to apply a lubricant to the peripheral surface of the toothed driver 244a to retard the accumulation of gum (adhesive, paper dust, and the like) on the toothed driver 244a. The applicator 547 is shown to be comprised of a curved strip of porous flexible resilient material, for example, felt. The applicator 547 is generally hat-shaped in transverse section. The applicator 547 is disposed between the outer surface of the toothed driver 244a and flanges 548 and 549 of respective subframe sections 215a and 216a. The flanges 548 and 549 support the applicator 547. A portion 550 of the applicator is disposed between the ends of the flanges 548 and 549 so it is apparent that the subframe sections 215a and 216a and their respective flanges 548 and 549 amply support and retain the applicator 547. The applicator 547 has a surface 551 which is in light contact with the peripheral surface of the toothed driver 242a. This light contact assures that lubricant contained in the applicator 547 is transferred to the peripheral surface of the driver 244a, but that the frictional drag on the driver 242a is negligible. The surface 551 of the applicator 547 corresponds generally to the contour of the peripheral surface of the driver 244a. Transverse slits or slots 547' in the applicator 547 facilitate bending of the strip to the shape of the periphery of the driver 244a. As best shown in FIG. 35, the applicator 547 has a groove 552 in which the teeth 249a of the driver 244a travel.

With reference to FIG. 45, it is noted that the applicator 547 is positioned in contact with that portion of the driver 244a which is out of the path of the supporting material web 32a. This obviates any wicking or bleeding of lubricant from the applicator 547 to the supporting material 32a. This is especially beneficial during such time as the apparatus 210a is not in use. Although the applicator 547 could be in the form of a roll, it is preferred to use an applicator in the form of a strip which is easy to manufacture and assemble. The applicator 247 can contain any suitable lubricant which can retard the transfer of gum from the supporting material 32a onto the driver 244a. By way of example, not limitation, the absorbent applicator 547 can contain the following suitable lubricant: Dow Corning 1107 fluid, a liquid silicone, described in Bulletin:05-169 dated February, 1967, of the Chemical Products Division, Dow Corning Corporation, Midland, Mich. 48640.

Referring to FIGS. 50 through 54, the brake 522 is shown to include a roll 553. The roll 553 has a pair of spaced apart O-rings 554 and 555 comprised of resilient material such as rubber. The roll 553 has stub ends 556 and 557 received in respective tracks 558 and 559 in respective subframe sections 215a and 216a. It is apparent that the roll 553 is rotatable and also movable relatively toward and away from surfaces 560 and 561 of respective subframe sections 215a and 216a. As shown in FIGS. 50 and 51, end portion 562 of print head frame 221a is in engagement with the O-rings 554 and 555 of roll 553, and the composite web 30a is clamped between the roll 553 and the surfaces 560 and 561. Accordingly, in this position of the brake 522, because of the friction exerted between the roll 553 and end portion 562 of the print head 219a, rotation of the roll 553 is prevented. Consequently, the composite web 30a which is in frictional engagement with the roll 553 and is clamped between the roll 553 and surfaces 560 and 561 is prevented from being advanced toward the delaminator 218a. In this position of the print head 219a (in which the operator 235a is in its initial position), a printed label 36a is in applying position relative to applicator 253a ready to be applied to an article. Once the label 36a has been applied, the user can again operate the operator 235a which causes the print head 219a to move toward the platen 217a. As the print head 219a moves toward the platen 217a, the portion 562 of the frame 221a of the print head 219a moves out of contact with the roll 553. At the printing position of the print head 219a, the portion 562 of the frame 221a is in the position shown in FIG. 52. When the user releases the operator 235a, the spring assembly 515 causes the toothed driver 244a to advance the composite web 30a and to effect return of the print head 219a to the position shown in FIG. 51. During return of the print head 219a from the position shown in FIG. 52 to the position shown in FIG. 51, the roll 553 permits the composite web 30a to advance as it rolls on the advancing web 30a. However, upon the substantial completion of travel of the print head 219a, the portion 562 again operates the brake 552 to effect clamping of the composite web 30a between the roll 553 and surfaces 560 and 561. The brake 522 is simple in construction and automatic in its operation and yet it serves the purpose of preventing any paying out of the composite web 30a from the roll during application of the label 36a. Such paying out of the web 30a can result in the event that the cuts 33a through the label material 31a are not complete so that the trailing edge of one label 36a remains connected to the leading edge of the next subsequent label 36a. As is evident in this embodiment of the invention the brake 522 exerts a substantial braking force on the web 30a, while brake surfaces 318a and 319a exert only a slight braking force on the core 44a.

With reference to FIGS. 55 through 57, there is shown a modification for the embodiment of FIGS. 1 through 34 and for the embodiment of FIGS. 35 through 54 and 58 through 70. Components which are generally related to those of either the embodiments of FIGS. 1 through 34 or 35 through 54 and 58 through 70 are indicated by the same reference characters, with the addition of the letter "b". Label printing and applying apparatus 210b includes subframe 214b having subframe sections 215b and 216b. The apparatus 210b differs from apparatus 210a only in the respect that leaf springs 312a and 313a rotatably mount core 44b of composite web 306. More specifically, axially aligned, one-piece, rolls 570 and 571 are rotatably mounted by arms or leaf springs 312a and 313a. The rolls 570 and 571 are identical in construction. The rolls 570 and 571 have frustroconical surfaces 572 and 573 which serve to automatically center the core 44b with respect to the center line CL of the subframe 214b. The rolls 570 and 571 have respective hubs 574 and 575 having respective bearing shoulders 576 and 577. The bearing shoulders 576 and 577 bear against the arms 312b and 313b. As the rolls 570 and 571 rotate the shoulders 576 and 577 prevent other portions of the respective rolls 570 and 571 from rubbing on the arms 312b and 313b. The arms 312b and 313b are flexible and resilient enough to enable the core 44b to be inserted on rolls 570 and 571 and yet rigid enough to enable the core 44b to be mounted as illustrated in FIGS. 55 and 57. The arms 312b and 313b are sufficiently yieldable to accommodate for manufacturing variations in the length of core 44b. The hubs 574 and 575 are rotatably received in holes 578 and 579 in arms 312b and 313b. Spring clips 580 and 581 prevent the hubs 574 and 575 from shifting off the arms 312b and 313b but permit the rolls 570 and 571 to rotate. Rolls 570 and 571 have respective circular cylindrical portions 582 and 583 which prevent the core 44b from slipping off when the composite web 30b is advanced. With reference to FIG. 57, a resilient device 584, illustrated as being a curved leaf spring, serves to facilitate the gradual paying out of the composite web 30b. In that the apparatus 210b causes the composite web 30b to be pulled once for each actuation and return cycle of the operator (235 or 235a), and in that the apparatus is capable of printing and applying multiple labels (36, 36a or 36b) in succession per second, the device 584 is conducive to the gradual unwinding of the composite web roll. When the composite web 30b is advanced, the resilient device 584 will move from the position shown by phantom lines to the position shown by solid lines in FIG. 57. As the roll unwinds gradually, the device 584 moves to the position shown by phantom lines in FIG. 57. One end 585 of the device 584 is retained in fixed position relative to a subframe 214b by fitting into a retaining pocket 586 formed partly in the subframe section 215b and partly by the subframe section 216b.

With reference to FIG. 58, there is shown diagrammatically the structure which is already shown in greater detail in FIGS. 24, 25 and 26, for example. Specifically, printing band 220a has a printing section 354a and a non-printing human readable section 355a. Such a printing band is well known and is disclosed in Canadian Pat. No. 653,495. The printing section 354a has printing blocks 353a and the non-printing section contains human readable indicia (FIG. 25) representative of the data which the printing blocks 353a are capable of printing. The printing section 354a is thicker than the non-printing section 355a as best seen in FIG. 58. The pointers 373 (FIG. 24) are modified to the extent that they are extended as shown at 373a in FIG. 58. The pointers 373a are molded integrally with the frame 371a which can be shifted in a direction parallel to the axis of the driven members 351a (only one of which is shown in FIG. 58). It is apparent that the pointers 373a include stop faces 587 and that the printing blocks 353a adjacent the non-printing section 355a have abutment faces 588. Thus, the non-printing section 355a is incapable of being moved to the printing position at which it would be inked by the ink roller. Inadvertent movement of the non-printing section to the printing and inking zone would result in inking of the human readable indicia which would make them difficult to read; but this problem is obviated by the present invention. The invention can be applied as well to type wheels of the type illustrated in FIGS. 32 through 34 which can have a printing section and an adjacent non-printing human readable section.

With reference to FIGS. 59 through 64, there is illustrated a method by which the platen 217a is made. Referring initially to FIG. 59, there is provided a flat sheet composed of bendable substantially rigid material. Although any suitable sheet material can be employed, it is preferred to use steel having a smooth surface, for example, polished stainless steel. Elongated sets of holes 601 and 602 and round holes 603 are shown to be cut through the sheet 600. The holes 601 and 602 are elongated in the same direction and are generally rectangular in shape. The holes 601 and 602 are symmetrical about a center line 604 extending through the centers of holes 603, with the holes 601 and 602 being in alignment with each other and with the holes 603. If desired the center line 604 of the inverse bend need not pass through the centers of the holes 603. The sheet 600 is inversely bent about the line 604 to provide a pair of plates or plate portions 605 and 606 joined by a bight portion 607. With a sheet of flexible, resilient moldable material 608 disposed between the plates 605 and 606 there is provided a sandwich arrangement which is placed between press members 609 and 610 of a press to effect extrusion of the moldable material into the space within the holes 601 and 602. This extrusion can be accomplished by applying pressure using the press members 609 and 610 accompanied by suitable heating means (not shown) for heating the moldable material 608. For this purpose, the platen members 609 and 610 can be heated. As shown in FIGS. 63 and 64 the sets of holes 601 and 602 are in alignment with each other. The platen 217a thus has flexible resilient platen sections 611, 612 and 613 which can yield independently of each other during printing as illustrated in FIG. 64. The composite web 30a is omitted from between printing members 220a and 220a' and the platen 217a in FIG. 64 for the sake of clarity. This means that each line of printing characters can produce quality printing irrespective of minor manufacturing variations in the print head or the platen which might otherwise cause poor printing quality. The plates or plate portions 605 and 606 cooperate to support the platen sections 611, 612 and 613 only at their peripheral edges, and more specifically they support the sections 611, 612 and 613 along the entirety of their respective peripheral edges but the platen sections 611, 612, and 613 are otherwise unsupported so that they can yield even beyond the surface of the underside of the platen 217a. The resultant platen 217a has a relatively sharp delaminator or peel edge 217a and the holes 603 provide generally semi-circular notches 614 at the peel edge 217a. Each notch 614 constitutes an interruption in the edge which reduces the area of contact with the web of supporting material 32a thereby reducing friction therebetween as the web 32a is drawn in the direction of arrow 615. With reference to FIGS. 61 and 62, the moldable material 608 which would otherwise exist in the notches 614 is preferably trimmed away.

Referring to FIG. 66, the inking mechanism 252a is shown in its operative inking position between the print head 219a and the platen 217a. The inking mechanism 252a includes the inker body 514 and an ink roller 620 carried by the inker body 514. The inking mechanism 252a also includes a pair of tracks 621 and 622 which guide the ink roller 620 as the print head 219a is driven toward and away from the platen 217a. With reference to FIG. 67, the one-piece inker body 514, which is composed of a flexible resilient material, has a pair of slotted arms 623 and 624 having respective elongated aligned slots 625 and 626. The ink roller 620 includes an ink receptive, tubular, porous ink roll 627 received by a hub 628 having hub portions 629 and 630. The hub portion 630 has a fluted projection 361 and the hub portion 629 has a bore 632 into which the projection 631 is adapted to be press-fitted. The ink roll 627, composed for example of rubber or the like, is received by the hub portions 629 and 630, as best shown in FIG. 69. The hub portions 629 and 630 have respective integral flanges or bearing rolls 633 and 634, which are adapted to ride on bearing surfaces 635 and 636 of the print head 219a. Stub ends 637 and 638 mount respective rollers 639 and 640, and 641 and 642. The rollers 640 and 641 are received in the elongated slots 625 and 626 of slotted portions 623 and 624, the rollers 639 and 642 are received in respective tracks 621 and 622.

The inker body 514 also has integrally formed arms or leaf springs 643 and 644 which carry the integrally formed pivot pins 512 and 513 received in the respective sockets 510 and 511.

As the print head 219a moves toward the platen 217a (FIG. 66), the constant slope of the tracks 621 and 622 causes the ink roller 620 to travel across the ink and the printing members 220a at the constant rate. When the print head 217a is in printing cooperation with the label 36a at the printing zone, the ink roller 620 has moved to the position shown by phantom lines (FIG. 66). When the print head 219a moves away from the platen 217a, a spring finger or leaf spring 645, formed integrally with the inker body 514, causes the bearing rolls 633 and 634 to roll along brearing surfaces 635 and 636. During all this travel of the inker body 514 and the ink roller 620 which it carries, the slotted portions 523 and 524 serve to mount the ink roller 620 and tracks 621 and 622 define the path of travel of the ink roller 620. Installation of the inker body 514 and its ink roller 620 is accomplished by flexing together the leaf springs 643 and 644 so that the respective pivot pins 512 and 513 can be inserted into the respective sockets 510 and 511. The inker body 514 can be removed by flexing together leaf springs 643 and 644. The ink roller 620 can be installed or removed from the inker body by flexing apart the slotted arms 623 and 624. FIG. 68 shows the inker body 514 and its ink roller 620 being removed from the apparatus, while housing part 502 and the corresponding housing part 502 (FIG. 65) are in an open position relative to the respective housing parts 501 and 503.

The print head 219a has two rows of printing bands as is shown in somewhat greater detail in FIG. 31. In order to print a third line of data between the two lines of printing members 22a, a slug 646 (FIGS. 66, 69 and 70) is inserted into the print head frame 221a. As best shown in FIG. 70, the slug 646 comprises a base 647 having a dovetail portion 648, a printing member 220a' and has a mating portion 648' received by the dovetail 648. The base 647 has a projection 650 receivable in a recess 651 in the print head frame 221a. The base 647 has an elongated extension 652 having a projection 653 which is received in a recess 654 in the print head frame 221a. In this manner, the slug 646 can be inserted into a slot 655 in the print head frame 221a and resiliently snapped into place by means of the projection 656 which can be used to facilitate insertion or removal of the slug 646.

It is preferred to mold the driver or feed wheel 244 of a material which incorporates a lubricant to diminish the amount of gum or adhesive that is transferred to the feed wheel 244 during use to prevent improper feeding. By incorporating the lubricant in the feed wheel 244 the surface of the feed wheel 244 has a low coefficient of friction. However, the teeth 249 are adequate to grip and drive the web 32. One specific material to be used to mold the feed wheel is an acetal resin combined with polytetrafluoroethylene lubricants. One such material is sold commercially under the name Thermocomp, Number KL-4030 by Liquid Nitrogen Processing Corporation, Malvern, Pa., U.S.A. The remainder of the apparatus in FIGS. 1 through 70, except for the platens 217 and 217a, O-rings 282 and 332, the ball bearings 228, 228a, 229 and 229a, the spring 238, the washers 365, rubber printing members 220, 22a and 220a, portion 648', spring 536, applicator 552, O-rings 554 and 555, clips 581 and 582, and the resilient device 584, are composed of suitable lightweight moldable plastic materials, for example, acetal, acrylonitrile-butadiene-styrene, or the like, but the ink rolls 311 and 627 are preferably constructed of porous vinyl. Accordingly, the apparatus is very light in weight, and easy and convenient to use with a minimum of fatigue.

Other embodiments and modifications of this invention will suggest themselves to those skilled in the art, and all such of these as come within the spirit of this invention are included within its scope as best defined by the appended claims.

I claim:

1. A hand-held label printing and applying machine for printing on labels carried on a web of supporting material, comprising: a housing having a first housing section and a second housing section, the first housing section having a handle, a print head mounted by the first housing section, means disposed in space within the housing for inking the print head, means for movably mounting the second housing section relative to the first housing section to afford access to the inking means, means for delaminating a printed label from the web, an applicator disposed adjacent the deliminating means, means including an actuator disposed at the handle of advancing the web to effect label delamination at the delaminating means, and means spaced from the second housing section mounting means for mounting the applicator on the second housing section.

2. Apparatus for printing and applying pressure sensitive labels utilizing a supply roll of a composite web having pressure sensitive labels releasably secured to a web of supporting material, the apparatus comprising: a housing having first and second relatively movable sections, the first section having a handle, a movable print head mounted by the first section, an inking mechanism disposed in space within the housing and driven by the print head, means for delaminating a printed label from the supporting material web, an applicator disposed adjacent the delaminating means, means including an actuator disposed at the handle for moving the print head and for advancing the supporting material web to effect label delamination at the delaminating means, the inking mechanism including a traveling ink roller having an ink roll movable relative to the print head and a bearing roll at each end of the ink roll, means carried by the second section for guiding the ink roller during its travel relative to the print head, means movably mounting the ink roller to the second section, means for biasing the ink roller toward the print head, the print head having bearing surfaces on which the bearing rolls roll as the ink roll inks the print head, and means for movably mounting the second section on the first section to provide access to the ink roller.

3. Apparatus for printing and applying pressure sensitive labels utilizing a supply roll of a composite web having pressure sensitive labels releasably secured to a web of supporting material, the apparatus comprising: a housing having first and second relatively movable sections, the first section having a handle, a movable print head mounted by the housing, an inking mechanism disposed in space within the housing and driven by the print head, means for delaminating a printed label from the supporting material web, an applicator disposed adjacent the delaminating means, means including an actuator disposed at the handle for moving the print head and for advancing the supporting material web to effect label delamination at the delaminating means, the inking mechanism including a traveling ink roller having an ink roll movable relative to the print head and a bearing roll at each end of the ink roll, means carried by the second section for guiding the ink roller during its travel relative to the print head, means movably mounting the ink roller to the second section, means for biasing the ink roller toward the print head, the print head having bearing surfaces on which the bearing rolls roll as the ink roll inks the print head, a mounting roll and a guide roll disposed at each end of the ink roller, the mounting rolls being carried by the mounting means and the guide rolls being in rolling cooperation with the guiding means, and means for movably mounting the second section to the first section to provide access to the ink roller.

4. Apparatus for printing and applying pressure sensitive labels utilizing a supply roll of a composite web having pressure sensitive labels releasably secured to a web of supporting material, the apparatus comprising: a frame having a handle, a movable print head mounted by the frame, an inking mechanism driven by the print head, means for delaminating a printed label from the supporting material web, an applicator disposed adjacent the delaminating means, means including an actuator disposed at the handle for moving the print head and for advancing the supporting material web to effect label delamination at the delaminating means, the inking mechanism including a traveling ink roller having an ink roll movable relative to the print head and a bearing roll at each end of the ink roll, means carried by the frame for guiding the ink roller during its travel relative to the print head, means movably mounting the ink roller to the frame, means for biasing the ink roller toward the print head, the print head having bearing surfaces on which the bearing rolls roll as the ink roller inks the print head, the frame including a housing, the ink roller being disposed in space within the housing, the housing having relatively movable sections, one section of the housing having means for removably mounting the ink roller mounting means, and means for movably mounting the sections to each other for relative movement to provide access to the ink roller.

5. Apparatus for printing and applying pressure sensitive labels utilizing a supply roll of a composite web having pressure senstive labels releasably secured to a web of supporting material, the apparatus comprising: a housing, the housing including a first section having a handle and a movable second section, a print head movably mounted by the first section, means adjacent the print head for delaminating printed labels, an applicator mounted to the movable section, and inking mechanism disposed in space within the housing, mounted on the second section and driven by the print head, the second section being movably mounted on the first section and being movable to provide access to the inside of the housing, the inking mechanism including an inker body movably mounted to the second section, an ink roller rotatably mounted to the inker body for contacting the print head, the second section having tracks for guiding the ink roller as the print head acts on the ink roller, and means for movably mounting the second section on the first section.

6. Apparatus as defined in claim 5, wherein the inker body has arms with slots for mounting the ink roller.

7. Apparatus as defined in claim 5, wherein the applicator comprises an applicator roll, and wherein the means for movably mounting the second section to the first section is spaced from the applicator roll.

8. An inking device for a labeling machine which prints labels carried on a web, said labeling machine comprising:

a frame, a print head in said frame; at least one row of types in said print head, said types facing toward a print position;

means for moving said print head toward and away from a label whereby said types may contact the label when said types have been moved to the label;

an actuating lever movably connected to said frame to operate said labeling machine; said actuating lever being connected to said print head for moving it toward and away from a label;

a pawl and ratchet mechanism responsive to movement of the actuated lever for advancing the web;

said inking device comprising;

an inking roller; support and moving means for moving said inking roller across said types as said print head moves toward the label and while the label is not in contact with said types;

inking roller guide means comprising a slot formed in said frame and extending along said frame past said types; engaging means on said inking roller for engaging in said slot; said slot being positioned and shaped to guide said inking roller to move over said types on a predetermined pathway with respect to said printing head; said predetermined pathway of said inking roller extends completely across all said types, such that said inking roller is out of the way of contact between a label to be imprinted and said types; said slot including side walls for defining said slot, and said side walls being positioned and shaped so as to engage said inking roller engaging means at a side thereof away from the side of said inking roller contacted by said types and for pressing said inking roller against said types and against force exerted by said types against said inking roller as said inking roller rolls by said types such that there is cooperative engagement between said slot side walls and said inking roller engaging means; said slot being shaped and positioned so that said slot side walls remain in engagement with said inking roller engaging means over the entire said predetermined pathway of said inking roller and also to cause said inking roller to press on said types;

said slot being inclined with respect to a perpendicular to the direction of movement of the print head; the inclined slot being in the path of movement of the types; spring means for causing the inking roller to move in one direction along the pathway;

said actuating lever causing said print head to act on said inking roller to move said inking roller along said predetermined pathway in the other direction against the urging of the spring means as said actuating lever is operated.

9. The inking device for a labeling machine of claim 8, wherein said types are arrayed in a plurality of rows thereof and said guide means extends past all said rows of types.

10. The inking device for a labeling machine of claim 5, wherein said engaging means comprises:

a support roller attached to and supporting said inking roller; said support roller being the part of said inking roller that is in engagement with said slot.

11. The inking device for a labeling machine of claim 10, wherein said support roller has a predetermined diameter and said slot has a width approximating said predetermined diameter.

12. The inking device for a labeling machine of claim 8, further comprising a pivot on said frame; said actuating lever being pivotally connected on said pivot, whereby said actuating lever pivotally moves with respect to said frame;

an inking roller support between said inking roller and said actuating lever for translating the pivoting motion of said actuating lever into motion of said inking roller along its said predetermined pathway.

13. A hand-held label printing and applying machine for printing on labels carried on a web of supporting material, comprising: a housing having a handle, a platen, a print head movably mounted in the housing toward and away from the platen, at least one row of printing members on the print head, the printing members facing toward a printing position, means for moving the print head toward and away from a label on the platen whereby the printing members can contact the label at the printing position when the printing members have moved to the label, an actuating lever disposed at the handle and operatively coupled to the print head for moving the print head toward and away from a label, means for pivotally mounting the actuating lever on the housing, a toothed feed wheel for engaging the web, a pawl and ratchet mechanism coupled to the actuating lever for driving the feed wheel, means for delaminating labels from the web, means for applying printed labels, an inking mechanism including an ink roller and means for mounting the ink roller for movement across the printing members as the print head moves toward the label, the housing including means defining spaced walls, each wall having means defining a guide, the guides being positioned and shaped to guide the ink roller across the printing members on a predetermined pathway with respect to the print head, wherein the predetermined pathway extends completely across all the printing members such that the ink roller is out of the way of contact between a label to be imprinted and the printing members, a spring for moving the ink roller in one direction, wherein the pathway is inclined with respect to a perpendicular to the direction of movement of the print head, the inclined pathway being in the path of movement of printing members on the print head so that movement of the print head toward the platen while in contact with the ink roller effect movement of the ink roller in the other direction along the pathway, and wherein the movement of the ink roller along the pathway while mounted on the mounting means is responsive to the movement of the actuating lever.

14. Hand-held apparatus for printing and applying pressure sensitive label utilizing a supply roll of a composite web having pressure sensitive labels releasably secured to a web of supporting material, the apparatus comprising: a housing having spaced side walls and a handle, a platen, a print head disposed between the spaced side walls and cooperable with the platen, means for delaminating labels from the web, means for applying printed labels, means for advancing the web, the web advancing means including a toothed feed wheel for engaging the web, a pawl and ratchet mechanism drivingly coupled to the feed wheel, means for moving the print head into printing cooperation with the platen and for thereafter moving the web advancing means, the moving means including a manually engageable operating lever disposed at the handle and means coupled to the operating lever for moving the print head and the pawl and ratchet mechanism in sequence, means for pivotally mounting the operating lever, an inking mechanism including a traveling carrier, means for pivotally mounting the carrier, means on the side walls defining a pair of spaced guides, an ink roller for inking the print head as the carrier travels, means for rotatably mounting the ink roller on the carrier, and shaft means mounted by and projecting in opposite directions outwardly from the carrier, said shaft means projecting outwardly into cooperation with and controlled by the guides for causing the carrier to pivot about the pivotal mounting means to effect inking of the print head by the ink roller in response to movement of the operating lever.

* * * * *

UNITED STATES PATENT AND TRADEMARK OFFICE
CERTIFICATE OF CORRECTION

PATENT NO. : 4,498,389

DATED : February 12, 1985

INVENTOR(S) : Paul H. Hamisch, Jr.

It is certified that error appears in the above-identified patent and that said Letters Patent are hereby corrected as shown below:

Column 1, line 19, after "3,968,106" there should be a comma --,--; line 21, after "3,783,083" there should be a comma --,--. Column 5, line 66, "pring" should be --print--. Column 11, line 2, "291" should be --219--; line 4, "pring" should be --print--. Column 17, line 45, "211a," should be --221a,--. Column 18, line 5, "recks" should be --racks--. Column 25, line 41, "of" should be --for--. Column 28, line 11, "5" should be --8--.

Signed and Sealed this

Twentieth Day of August 1985

[SEAL]

Attest:

DONALD J. QUIGG

Attesting Officer     Acting Commissioner of Patents and Trademarks